US012511358B2

(12) United States Patent
Tashiro et al.

(10) Patent No.: US 12,511,358 B2
(45) Date of Patent: Dec. 30, 2025

(54) PHOTOGRAPHING DEVICE, CONTROL METHOD THEREOF, AND PROGRAM

(71) Applicant: DAI NIPPON PRINTING CO., LTD., Tokyo (JP)

(72) Inventors: Jin Tashiro, Kokubunji (JP); Tomoya Hayase, Kawasaki (JP); Sho Kato, Hino (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 316 days.

(21) Appl. No.: 18/038,561

(22) PCT Filed: Jan. 27, 2022

(86) PCT No.: PCT/JP2022/003158
§ 371 (c)(1),
(2) Date: May 24, 2023

(87) PCT Pub. No.: WO2022/163774
PCT Pub. Date: Aug. 4, 2022

(65) Prior Publication Data
US 2024/0004978 A1 Jan. 4, 2024

(30) Foreign Application Priority Data

Jan. 28, 2021 (JP) ................................. 2021-011866
Jun. 21, 2021 (JP) ................................. 2021-102653

(51) Int. Cl.
*G06F 21/32* (2013.01)
*G06V 10/44* (2022.01)
(Continued)

(52) U.S. Cl.
CPC .............. *G06F 21/32* (2013.01); *G06V 10/44* (2022.01); *G06V 40/172* (2022.01);
(Continued)

(58) Field of Classification Search
CPC .......... G06F 21/32; G06F 21/31; G06F 21/34; G06F 21/35; G06V 10/44; G06V 40/172;
(Continued)

(56) References Cited

U.S. PATENT DOCUMENTS 4,843,377 A * 6/1989 Fuller .................... H04M 11/00
379/49
5,719,950 A * 2/1998 Osten ..................... G06V 40/40
340/5.82
(Continued)

FOREIGN PATENT DOCUMENTS

JP     2001-160118 A     6/2001
JP     2004-160983 A     6/2004
(Continued)

OTHER PUBLICATIONS

Nov. 28, 2024 extended Search Report issued in European Patent Application No. 22745993.0.
(Continued)

*Primary Examiner* — Kathleen Y Dulaney
(74) *Attorney, Agent, or Firm* — Oliff PLC

(57) ABSTRACT

A photographing device can realize electronic applications by performing strict identity verification. A photographing device reads surface information on an applicant's ID card (an identity verification medium) or data on an IC chip by using a reading device, a camera, an IC card reader, or the like. Also, the camera captures an application image that is to be used for an application procedure. A control unit (a same-person determination unit) of the photographing device compares the surface information read from the ID card or an image of the person contained in the IC chip with the captured application image to determine whether the person is the same or not. Further, the control unit (an
(Continued)

authenticity determination unit) determines authenticity of the ID card based on the information read from the ID card.

17 Claims, 24 Drawing Sheets

(51) Int. Cl.
  *G06V 40/16* (2022.01)
  *H04N 1/00* (2006.01)
  *H04N 1/44* (2006.01)
(52) U.S. Cl.
  CPC ....... *H04N 1/00244* (2013.01); *H04N 1/4413* (2013.01); *H04N 1/442* (2013.01)
(58) Field of Classification Search
  CPC .. H04N 1/00244; H04N 1/4413; H04N 1/442; G03B 17/53; G06Q 20/18; G06Q 50/265; G07F 5/20; G07F 17/0014
  USPC .......................................................... 382/115
  See application file for complete search history.

(56) References Cited

U.S. PATENT DOCUMENTS

| | | | | |
|---|---|---|---|---|
| 6,185,316 B1* | 2/2001 | Buffam | ................. | H04L 9/3231 382/125 |
| 6,742,712 B1* | 6/2004 | Kawaguchi | .............. | G07C 9/23 235/492 |
| 11,288,530 B1* | 3/2022 | Genner | ................... | G06F 21/32 |
| 11,594,072 B1* | 2/2023 | Trani | ..................... | G06V 20/52 |
| 11,645,729 B1* | 5/2023 | Kocher | ................. | G06Q 10/10 705/325 |
| 2008/0159602 A1* | 7/2008 | Zank | ................... | G06V 40/376 382/124 |
| 2009/0169068 A1* | 7/2009 | Okamoto | ............ | B60K 28/063 382/118 |
| 2013/0103951 A1* | 4/2013 | Klevan | .................. | G06F 21/34 713/186 |
| 2015/0363586 A1* | 12/2015 | Klevan | ............... | G06F 21/6245 726/19 |
| 2018/0101721 A1* | 4/2018 | Nienhouse | ........... | B60K 28/063 |
| 2018/0232836 A1* | 8/2018 | Schmalz | .................. | G07C 9/20 |
| 2018/0288037 A1* | 10/2018 | Yang | ....................... | G06F 21/35 |
| 2018/0337917 A1* | 11/2018 | Wallace | ................. | G06V 40/70 |
| 2019/0042895 A1* | 2/2019 | Liang | ................... | G06V 10/764 |
| 2019/0294900 A1* | 9/2019 | Li | .......................... | G06V 40/70 |
| 2020/0195436 A1* | 6/2020 | Khan | .................... | H04L 9/0637 |
| 2021/0075788 A1* | 3/2021 | Pasterk | ................. | H04L 9/3239 |
| 2021/0176242 A1* | 6/2021 | Mcdougall | .............. | G06F 21/32 |
| 2021/0295017 A1* | 9/2021 | Aoyagi | ..................... | G06T 7/00 |
| 2022/0405765 A1* | 12/2022 | Bekiyants | ........... | H04L 63/0861 |

FOREIGN PATENT DOCUMENTS

| | | |
|---|---|---|
| JP | 2004-314431 A | 11/2004 |
| JP | 2006-048263 A | 2/2006 |
| JP | 2007-011456 A | 1/2007 |
| JP | 2008-023906 A | 2/2008 |
| JP | 2012-215977 A | 11/2012 |
| JP | 2014-115801 A | 6/2014 |
| JP | 2018-093310 A | 6/2018 |
| JP | 2019-209603 A | 12/2019 |
| JP | 2020-021162 A | 2/2020 |
| JP | 2020-021163 A | 2/2020 |
| JP | 2020-064541 A | 4/2020 |
| WO | 2020/022014 A1 | 1/2020 |

OTHER PUBLICATIONS

Ministry of Foreign Affairs of Japan, "Roadmap for digitalization of administrative procedures," Dec. 15, 2020, <http://www.moj.go.jp/content/001318660.pdf>.

Aug. 30, 2021 Office Action issued in Japanese Patent Application No. 2021-102653.

Mar. 1, 2022 International Search Report issued in International Patent Application No. PCT/JP2022/003158.

Jul. 31, 2023 International Preliminary Report on Patentability issued in International Patent Application No. PCT/JP2022/003158.

* cited by examiner (a)

(b)

(a)

(b)

PHOTOGRAPHING DEVICE, CONTROL METHOD THEREOF, AND PROGRAM

TECHNICAL FIELD OF THE INVENTION

The present invention relates to a photographing device, a control method of the photographing device, and a program, particularly relating to electronic applications for administrative procedures and the like.

BACKGROUND OF THE INVENTION

Electronic application schemes utilizing smartphones and the like are beginning to penetrate into the marketplace. For example, it has been planned to introduce electronic application procedures into applications of new passports or renewal of passports, renewal of individual number cards, driver's license cards, etc., and to realize such the application procedures online. Identity verification using an identity verification medium (an identification card), such as a driver's license card, is essential for the applications. However, without face-to-face verifications and with personal devices being used in electronic applications, there are concerns of illegal acts of impersonation by forgery or alteration of ID cards.

Patent Document 1 discloses a technology for detection of forgery or the like of an ID card such as a driver's license card. An authenticity determination device of Patent Document 1 includes a reading device for reading an ID card and a computer for determining authenticity, in which the computer determines authenticity of the ID card by determining whether there are any inconsistencies in contents of character information obtained from a surface image of the ID card or not.

RELATED ART

Patent Document

[Patent Document 1] Japanese Unexamined Patent Application Publication No. 2019-209603 (JP-A-2019-209603)

Non-Patent Document

[Non-Patent Document 1] "Time schedule for digitization of administrative procedures" by Ministry of Foreign Affairs of Japan (online document searched through the Internet on Dec. 15, 2020<http://www.moj.go.jp/content/001318660.pdf5)

SUMMARY OF THE INVENTION

Problems to be Solved by the Invention

Unfortunately, as mentioned above, a risk of data forgery is much higher in electronic applications than in real face-to-face application procedures, and thus it is difficult to perform strict identity verification. It is also difficult to ask users for appropriate photographs if the users use their own smartphones or PCs for the electronic applications. In fact, according to Non-Patent Document 1 ("Time schedule for digitization of administrative procedures"), smartphones or home PCs are not allowed to be used in electronic applications of the next-generation passports.

The present invention was made in view of such problems. It is an object of the present invention to provide a photographing device that can realize electronic applications by performing strict identity verification.

Means for Solving Problems

To solve the above problems, a first aspect of the present invention is a photographing device having a camera that captures an image of an applicant as a person to be photographed. The photographing device includes reading means configured to read information of an identity verification medium of the applicant, application image capture means configured to capture by using the camera an application image, which is a photograph that is to be used for an application procedure, same-person determination means configured to compare an image of a person contained in the information read by the reading means with the application image and to determine whether the person is the same or not, authenticity determination means configured to determine authenticity of the identity verification medium based on the information read by the reading means, and output means configured to output the application image to a predetermined server if it is determined by the same-person determination means that the person is the same and it is determined by the authenticity determination means that the identity verification medium is authentic.

The photographing device according to the first aspect of the present invention reads information of the applicant's identity verification medium by using the reading means, captures by using the camera the application image that is a photograph to be used for the application procedure, compares the image of the person contained in the information read by the reading means with the application image, and determines whether the person is the same or not. Also, the photographing device determines authenticity of the identity verification medium based on the information read by the reading means. If it is determined by the same-person determination means that the person is the same and it is determined by the authenticity determination means that the identity verification medium is authentic, the photographing device outputs the application image to the predetermined server.

In this way, by using the photographing device, it is possible to strictly determine the authenticity of the identity verification medium and to strictly check whether the person mentioned on the identification verification medium is the same person that is to be photographed (the applicant). Thus, illegal acts in electronic applications can be prevented, thereby realizing electronic applications for administrative procedures and the like. By using the image captured by the photographing device for the application, an appropriate application image can be provided.

In the first aspect of the present invention, the reading means is configured to include at least one of a scanner that reads information on a surface of the identity verification medium, a camera that captures an image of the surface, and a reader that reads data recorded on a recording medium in the identity verification medium. The authenticity determination means is configured to determine the authenticity of the identity verification medium based on at least one of the information on the surface read by the scanner, the image of the surface captured by the camera, and the data read by the reader. The photographing device may further include input means configured to input password information for the identity verification medium, and the reader may use the password information that is input by the input means to read the data stored in a storage region protected by the password information. Furthermore, the authenticity determination means may be configured to determine the authenticity of the identity verification medium based on the data stored in the storage region that is protected by the password information. This enables to determine authenticity of the identity verification medium by using the information on the surface of or the data recorded in the identity verification medium.

It is preferable that the application image capture means is configured to allow wide-angle photography and the photographing device further includes object detection means configured to detect from the captured image an object covering a face of the person to be photographed. For example, the object detection means is configured to detect the object from the wide-angle photographed image by detecting at least one of a corner, a frame, and an edge. In this way, the object covering the face of the person to be photographed can be detected, and thus illegal photography can be detected.

Also, it is preferable that the photographing device further includes image determination means configured to determine whether the application image is an appropriate photograph to be used for the application procedure. In this way, the application image that is appropriate for the application procedure can be provided with certainty.

The photographing device may further include vision test means configured to display a vision test screen and to carry out a vision test for the applicant. In this way, the photographing device can be used for applications that require a vision test, such as a driver's license application.

Also, the photographing device may further include electronic signature means configured to display an electronic signature screen and to accept an input of an electronic signature of the applicant.

The photographing device may also include an alcohol detector that detects alcohol contained in the applicant's breath. The photographing device may further include a biometric authentication apparatus that reads biological information of the applicant, and executes an authentication process based on the read biological information. The biometric authentication apparatus may be either one of, or a combination of, the followings: a finger-print authentication apparatus that reads the applicant's finger-print information and executes the authentication process based on the read finger-print information, a vein authentication apparatus that reads the applicant's vein information and executes the authentication process based on the read vein information, and an iris authentication apparatus that reads the applicant's iris information and executes the authentication process based on the read iris information.

It is preferable that the photographing device further includes a document scanner that reads a document that is used for the application procedure, and the output means configured to output, together with the application image, document data read by the document scanner to the predetermined server. In this way, a set of the result of the identity verification and the image and the document required for the application can be prepared for the electronic application.

It is preferable that the photographing device further includes setting means configured to set password information necessary for the application procedure, and the output means is configured to output the password information set by the setting means together with the application image to the predetermined server. In this way, the password information that is to be set at the time of application, such as a PIN for a driver's license, can be entered through the photographing device.

It is preferable that the photographing device includes registered-information acquiring means configured to acquire registered information registered by the applicant on the server in advance, and identity verification means configured to verify identity of the applicant by comparing the registered information acquired by the registered-information acquiring means with the information read by the reading means. In this way, the application through the photographing device can be efficiently carried out using the information registered by the applicant in advance using his/her home PC or the like. At this time, contents of the identity verification medium are compared with contents of the registered information so as to verify identity of the applicant and to prevent illegal applications.

A second aspect of the present invention is a control method of a photographing device having a camera that captures an image of an applicant as a person to be photographed. The method includes a reading step of reading information on the applicant's identity verification medium, an application image capture step of capturing by using the camera an application image, which is a photograph that is to be used for an application procedure, a first same-person determination step of comparing an image of a person contained in the information read in the reading step with the application image and determining whether the person is the same or not, an authenticity determination step of determining authenticity of the identity verification medium based on the information read in the reading step, and an output step of outputting the application image to a predetermined server if it is determined in the first same-person determination step that the person is the same and it is determined in the authenticity determination step that the identity verification medium is authentic.

According to the second aspect of the present invention, by using the photographing device, it is possible to strictly determine the authenticity of the identity verification medium and to strictly check whether the person mentioned on the identification verification medium is the same person that is to be photographed (the applicant). Thus, illegal acts in electronic applications can be prevented, thereby realizing electronic applications for administrative procedures and the like. By using the image captured by the photographing device for the application, the appropriate application image can be provided.

The control method of the photographing device may further include a step of accepting an entry of an authentication code and acquiring a unique ID, which is information linked to the authentication code, and the unique ID may be linked to the application image and sent to the server in the output step. In the output step, attachment information may also be linked to the application image and the unique ID and sent to the server.

Also, in the second aspect of the present invention, it is preferable that the control method of the photographing device further includes a second same-person determination step of comparing the applicant's front face image that is cutout from a movie captured in a living-body determination process with the application image to determine whether the photographed person is the same person in the movie or not.

Furthermore, in the first same-person determination process, it is preferable to compare the applicant's front face image that is cutout from the movie captured in the living-body determination process with the image of the person contained in the information read in the reading step as well as with the application image so as to determine if the images are of the same person.

A third aspect of the present invention is a program that causes a control device of a photographing device, which has a camera that captures an image of an applicant as a person to be photographed, to function as reading means configured to read information of an identity verification medium of the applicant, application image capture means configured to capture by using the camera an application image, which is a photograph that is to be used for an application procedure, same-person determination means configured to compare an image of a person contained in the information read by the reading means with the application image and to determine whether the person is the same or not, authenticity determination means configured to determine authenticity of the identity verification medium based on the information read by the reading means, and output means configured to output the application image to a predetermined server if it is determined by the same-person determination means that the person is the same and it is determined by the authenticity determination means that the identity verification medium is authentic.

The third aspect of the present invention allows a computer to function as a control device of the photographing device according to the first aspect of the present invention.

Effects of the Invention

The present invention allows a photographing device to perform strict identity verification, thereby realizing electronic applications for administrative procedures and the like.

BRIEF DESCRIPTION OF DRAWINGS

FIG. 26 (b) is a view showing an example of a measurement result screen 72.

FIG. 28 (b) is a view showing an example of a checking screen 75 for checking the scanned document data.

DESCRIPTION OF SOME EMBODIMENTS

Hereinafter, preferable embodiments of the present invention will be described in detail with reference to the accompanying drawings. A photographing device 1 according to the present invention includes a stationary type photographing device for taking identification photos that is installed at a storefront, at a station, on a street corner, or the like, as well as a stationary type photographing device for taking photos for purposes other than identification photos.

Figure 1:
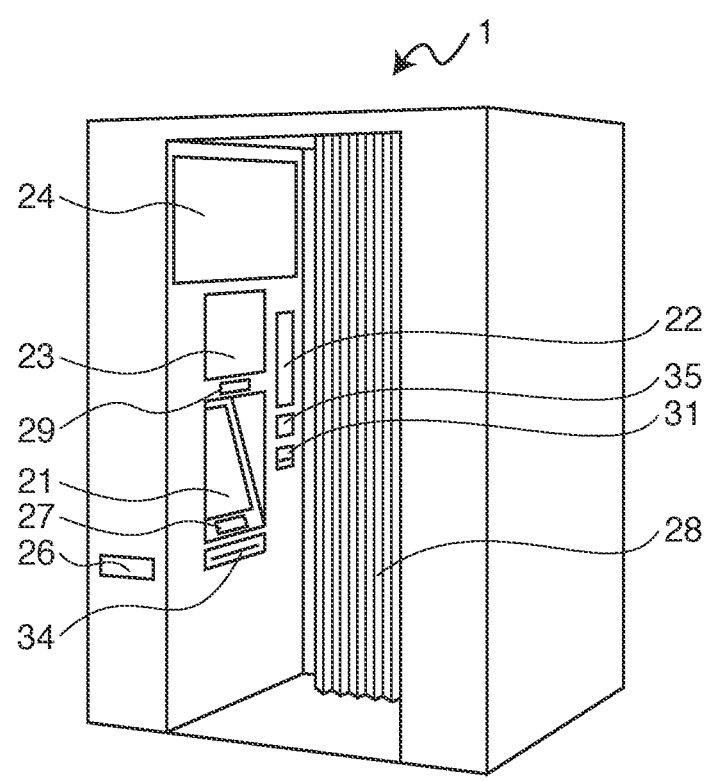
FIG. 1 is a view showing an external appearance of a configuration of a photographing device 1.
Figure 2:
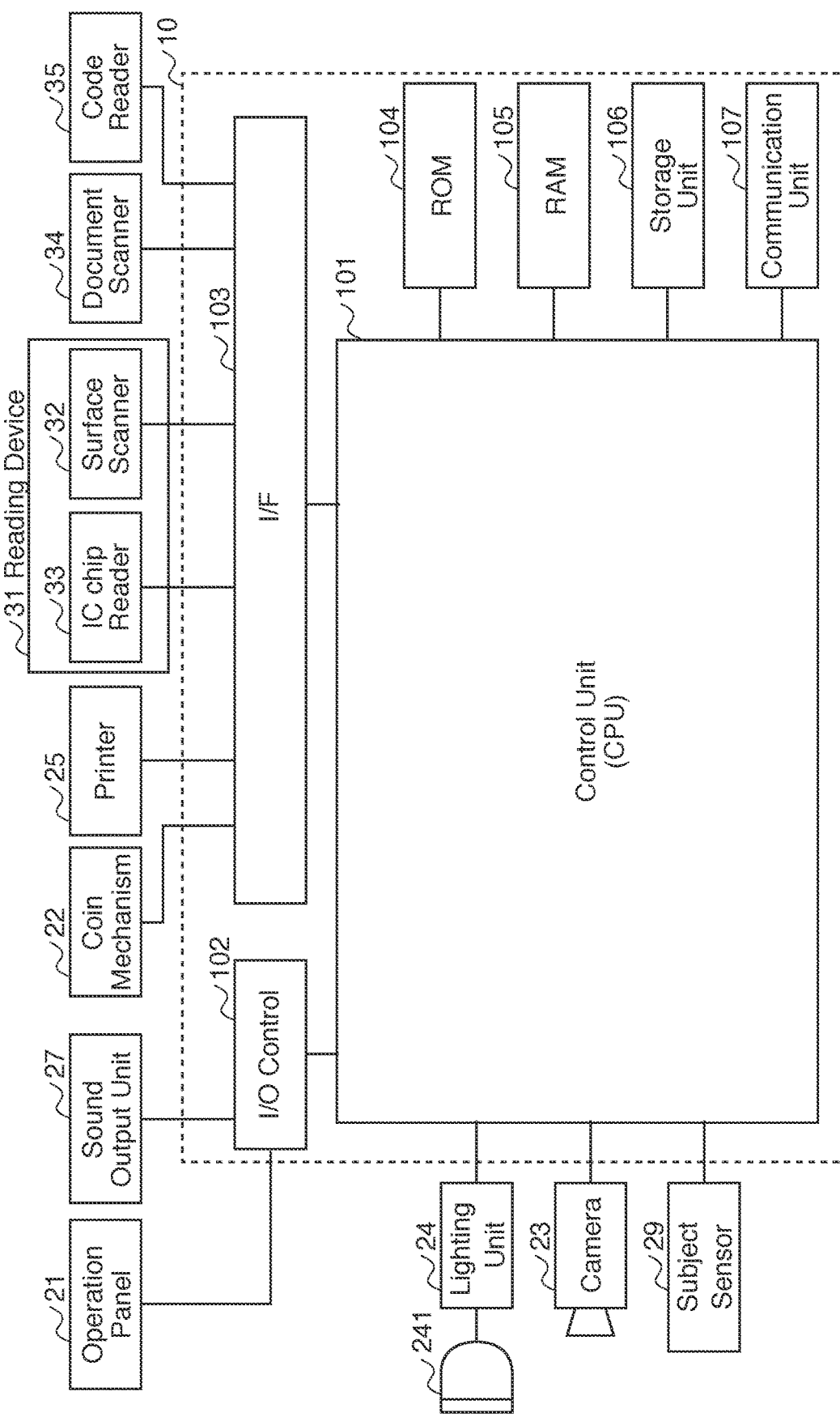
FIG. 2 is a view showing a hardware configuration of the photographing device 1.

FIG. 1 is a view showing an external appearance of a configuration of the photographing device 1, and FIG. 2 is a view showing a hardware configuration of the photographing device 1. As shown in FIG. 1, the photographing device 1 is a box-shaped device having a housing, which is a photo studio, into which a person can enter to be photographed and operate the device. The form of the photographing device 1 is not limited to the box shape, and may be an open type or a stand type, etc. The photographing device 1 provides an ID photo menu and an image print menu: the ID photo menu has a function of taking an image of a person inside the photo studio as a person to be photographed, creating an identification photo from the image, and printing out the identification photo according to its intended use; and the image print menu has a function of printing out an image received from a user's terminal 6 such as a smartphone, or downloading and printing out an image that the user has uploaded from the terminal 6 to a server 5 in advance. Also, in the present invention, the photographing device 1 provides an application menu for application procedures for driver's license, individual number cards, resident cards, special permanent resident cards, passports, and so on. The user can select and use any of the ID photo menu, the image print menu, the application menu, and the other menus.

As illustrated in FIG. 1, the photographing device 1 is in a box shape having an opening on a side, being separated into an exterior and an interior (the photo studio) by a curtain 28. A front panel inside the photo studio is provided with an operation panel 21, a coin mechanism 22, a camera 23, a lighting unit 24, a sound output unit 27, a subject sensor 29, a reading device 31 for reading an identity verification medium (hereinafter, referred to as an ID card), a document scanner 34, a code reader 35, and so on. Also, a control device 10, a printer 25, and the like are accommodated inside the housing of the photographing device 1, and printed matters printed by the printer 25 are discharged from a print outlet 26 that is provided on an outer-wall panel of the photographing device 1.

FIG. 2 is a block diagram showing a hardware configuration of the photographing device 1. As shown in FIG. 2, the control device 10 of the photographing device 1 is connected via a bus to the lighting unit 24, the camera 23, the subject sensor 29, the sound output unit 27, the operation panel 21, the coin mechanism 22, the printer 25, the reading device 31, the document scanner 32, the code reader 35, and so on, and the control device 10 controls each unit.

The control device 10 includes a control unit (CPU: central processing unit) 101, an I/O (input/output) control 102, an I/F (interface) 103, a ROM (read only memory) 104, a RAM (random access memory) 105, a storage unit 106, a communication unit 107, and so on. The control device 10 is connected to the operation panel 21 and the sound output unit 27 via the I/O control 102. Also, the control device 10 is connected to the coin mechanism 22, the printer 25, the reading device 31, the document scanner 34, and the code reader 35 via the I/F 103.

The control unit 101 is a CPU that centrally controls each unit of the photographing device 1. The control unit 101 reads out a program stored in the storage unit 106, the ROM 104, or the like to a work memory region on the RAM 105 and executes the program. The ROM 104 is a non-volatile memory that permanently holds programs such as a boot program and programs such as BIOS, data, and the like. The RAM 105 is a volatile memory that temporary holds the programs and data loaded from the storage unit 106 and the ROM 104 etc., and also includes the work memory region to be used for various processes executed by the control unit 101.

The storage unit 106 is any of a hard disk drive, a solid state drive, a flash memory, and the like, and stores programs to be executed by the control unit 101 for processes described below, data required for the execution of the programs, an OS, and the like. The programs and the data are read out and executed by the control unit 101 as necessary.

The I/O control 102 is an interface for input and output of various information from and to the operation panel 21, the sound output unit 27, and so on.

The I/F 103 is an interface for input and output of various information from and to the coin mechanism 22, the printer 25, the reading device 31, the document scanner 34, and the code reader 35.

Figure 3:
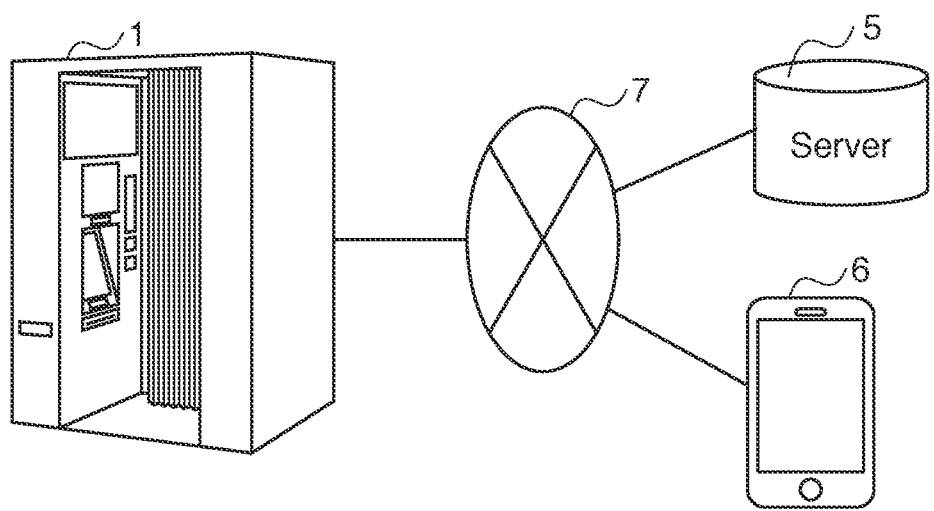
FIG. 3 is a view showing an example of a communication connection between the photographing device 1 and a server 5.

The communication unit 107 includes a communication control device that controls communication of the photographing device 1 and a communication interface. FIG. 3 is a view illustrating communication connection between the photographing device 1 and the server 5. The photographing device 1 is provided with a wireless LAN such as Wi-Fi (a registered trademark) or a short-range wireless communication system such as Bluetooth (a registered trademark), and has a communicational connection to the server 5 via a wide-area network such as the Internet.

The server 5 is a server that manages the photographing device 1. When a user enters, from the user's terminal 6 into the server 5 using a web browser or an application, information that is necessary for identity verification or information required for an application, the server 5 issues a predetermined code and registers the entered information making a link to the code. The server 5 includes a storage region that stores various data (photo images and other data) that are uploaded from the photographing device 1.

The user can download data of a photo image captured by the photographing device 1 from the server 5 via the network 7 to the terminal 6 such as a PC or a smartphone. Also, an image that is uploaded from the user's terminal 6 via the network 7 to the server 5 can be downloaded to the photographing device 1 and printed out (the image print menu).

Going back to descriptions of FIG. 1 and FIG. 2, the lighting unit 24 is a surface light source that is located in front, at the back, or the like of the person to be photographed. The lighting unit 24 is connected to a light source (stroboscope) 241 of which flash timing and an amount of luminescence are controlled according to control signals input by the control unit 101.

The camera 23 is a digital camera including a photographing element such as an optical lens, a CCD (charge coupled device), and a CMOS (complementary metal-oxide semiconductor) with an A/D (analog/digital) conversion unit and the like. The camera 23 captures a movie or a still image according to the control signals input by the control unit 101. The camera 23 inputs the captured image data into the control unit 101. The control unit 101 then outputs and displays the image data input by the camera 23 to a display of the operation panel 21. The camera 23 also functions as reading means configured to read an ID card by photographing a surface of the ID card.

The operation panel 21 is the operation means of the photographing device 1 and has a display for displaying an operation screen to show operation procedures and a preview screen etc., as well as a touch panel for the user to enter operation instructions. The operation panel 21 executes display processes according to display signals input by the control unit 101. The operation panel 21 also sends control signals to the control unit 101 according to touch operations on the touch panel.

The subject sensor 29 is a sensor that detects a person inside the photo studio. The subject sensor 29 outputs a detection signal to the control unit 101 when the person approaches a front panel of the photographing device 1. For the subject sensor 29, an optical sensor including a light transmitter and a photoelectric receiver or the like, is used.

The sound output unit 27 acquires predetermined voice-sound data (operation guidance voice etc.) from the ROM 104 or the storage unit 106 according to the control signals input by the control unit 101, and outputs the sound through a speaker.

The coin mechanism 22 is a cash register provided with a money depositing slot for coins and bills, a return slot for change, and so on. The coin mechanism 22 executes a payment process for charges of the photographing device 1. The coin mechanism 22 outputs information related to the money received through the money depositing slot to the control unit 101, and discharges coins and/or bills for change to the return slot according to the control signals input by the control unit 101. Note that, instead of the coin mechanism 22, other payment process units configured for IC card payments or smartphone payments may also be used.

The printer 25 prints out onto predetermined paper the image data of a photograph captured according to the control signals input by the control unit 101. The printer 25 is a high-resolution color printer and may be of any type, including sublimation type and melting type.

The reading device 31 is a device for reading information of the ID card. More specifically, the reading device 31 includes a surface image scanner 32 for scanning and reading the information on a surface (the front and back faces) of the ID card, and an IC chip reader 33 (a contactless/contact IC reader etc.) for reading data recorded on an IC chip on the ID card. The surface image scanner 32 may be a common image scanner with a white-light light source, or may be a UV/IR scanner including an ultraviolet-ray (UV) light source or an infrared-ray (IR) light source. Also, the IC chip on the ID card has a free memory region that is not protected by password information, and a locked memory region that is protected by password information. The reading device 31 can read data in the free memory region and the locked memory region. The reading device 31 inputs into the control unit 101 the image data on the surface of the ID card (hereinafter, refereed to as surface information) read by the surface scanner 32. The reading device 31 also inputs into the control unit 101 the data read by the IC chip reader 33.

Also, instead of reading the ID card by using the above-mentioned reading device 31, the camera 23 or an IC card reader may be used for reading the information on the surface (the front and back faces) of the ID card. More specifically, (1) the camera 23 photographs the surface of the ID card, and the captured image of the surface is OCR processed to read character information on the surface, while the IC card reader reads the back face of the ID card. Alternatively, (2) the camera 23 photographs both the front and back faces of the ID card and the captured images of the front and back faces are OCR processed to read the information on the front and back faces.

The document scanner 34 is a scanner for optically reading a sheet of paper of approximately A4 size (210 mm by 297 mm). The document scanner 34 reads a document to be used for the application procedure and inputs the read document data into the control unit 101.

The code reader 35 is a device for reading a two-dimensional code such as a QR code (a registered trademark) and a bar code, and inputs the read code information into the control unit 101. The code reader 35 is used, for example, when reading a QR code (an authentication code) that is to be used in an identity verification process, which will be described below.

Figure 4:
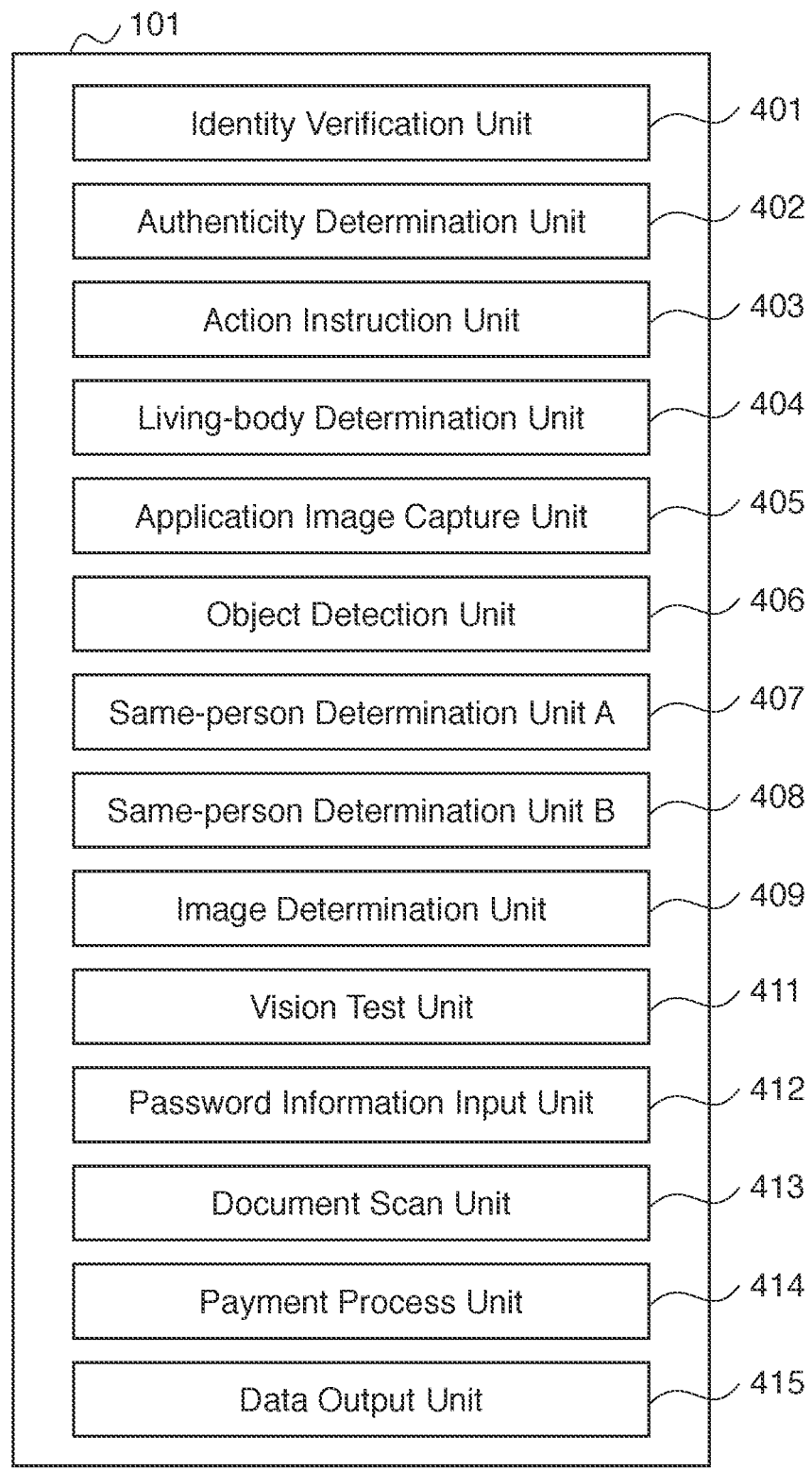
FIG. 4 is a view showing a functional configuration of a control unit 101 of the photographing device 1.

Next, a functional configuration of the control unit 101 of the photographing device 1 will be described. FIG. 4 is a block diagram showing the functional configuration of the control unit 101 of the photographing device 1 in an application mode. As shown in the drawing, the control unit 101 includes, as means for realizing the present invention, an identity verification unit 401, an authenticity determination unit 402, an action instruction unit 403, a living-body determination unit 404, an application image capture unit 405, an object detection unit 406, a same-person determination unit A407, a same-person determination unit B408, an image determination unit 409, a vision test unit 411, a password information input unit 412, a document scan unit 413, a payment process unit 414, and a data output unit 415.

The identity verification unit 401 executes the identity verification process using the authentication code. The authentication code is identification information for verification given by the server 5 to an applicant who is about to proceed to an application procedure using the photographing device 1, and the authentication code is linked to uniquely identified information including information of numbers and letters (a unique ID). The unique ID is converted into a QR code or a bar code and notified to the applicant as the authentication code. Alternatively, instead of the QR code or the bar code, the unique ID may be recorded as the authentication code on an IC card or a magnetic card. When the applicant accesses the server 5 from the applicant's own terminal 6 and enters predetermined information (personal information such as name and date of birth, application detail (which application), and other information necessary for the application, etc.), the server 5 issues and sends the unique ID (the authentication code) to the terminal 6. The server 5 stores the entered information as registered information being linked to the unique ID (the authentication code). When using the photographing device 1, the applicant manually enters the authentication code (the unique ID) using a software keyboard, or shows the above-mentioned QR code (the authentication code) on the terminal 6, which is then held up to the code reader 35. Alternatively, if the authentication code (the unique ID) is recorded on an IC card or a magnetic card, an IC card reader or a magnetic card reader (omitted in the drawings) provided on the photographing device 1 reads the IC card or the magnetic card so that the photographing device 1 acquires the authentication code (the unique ID). The photographing device 1 accesses the server 5, acquires the registered information stored being linked to the authentication code (the unique ID) from the server 5, and stores the information in a predetermined folder (the storage unit 106). Also, the applicant inserts the applicant's ID card into the photographing device 1 to let the reading device 31, or the camera 23, the IC card reader, or the like, read the information on the ID card. The identity verification unit 401 compares the registered information acquired from the server 5 with the information read from the ID card by the reading device 31, the camera 23, the IC card reader, or the like, and determines whether predetermined information such as the name and date of birth coincide one another to verify the identity of the applicant.

The ID card is an identity verification medium, such as a driver's license, an individual number card, a resident card, and a special permanent resident card, that is used for verifying identity at administrations, financial institutions, mobile phone carriers, etc. In a case of a driver's license, the person's name, date of birth, address, date of issuance, expiration date, and the name of the issuer of the ID card, etc. are printed on the surface of the driver's license. Also, the IC chip on the ID card stores a part or all of such information. A memory region of the IC chip includes a locked memory region that is protected by password information such as a PIN, and a free memory region that is not protected by the password information.

The authenticity determination unit 402 determines authenticity of the ID card. The authenticity determination unit 402 determines whether the ID card is forged or altered or not based on the information read by the reading device 31 or the information acquired by the camera 23 and/or the IC card reader. In the present embodiment, the reading device 31 includes the surface scanner 32 and the IC chip reader 33, and thus it is possible to scan the surface information of the ID card or to read the data recorded on a recording medium (the IC chip) in the ID card. The authenticity determination unit 402 determines the authenticity of the ID card based on the surface information read, or based on the data recorded on the IC chip. The authenticity determination unit 402 also determines authenticity of the ID card from both or either of the image of the surface captured by the camera 23 and the information read by the IC card reader. The authenticity determination unit 402 may determine the authenticity of the ID card based on the data stored in the locked memory region of the ID card if it is possible to read the data in the locked memory region. A specific method for determining the authenticity will be described below. The authenticity determination unit 402 stores a result of the determination in a predetermined folder (the storage unit 106).

The authenticity determination unit 402 is a function pertaining to a main point of the present invention.

The action instruction unit 403 instructs actions to the applicant for the living-body determination unit 404, which will be described below, to determine whether the applicant is a living body or not. The action instruction unit 403 gives instructions of actions, for example, by voice sound from the sound output 27, or by displaying written instructions or instruction movies or animations on the operation panel 21. It is preferable that the action instruction unit 403 shows, in a random order, a plurality of instructions selected from a plurality of action instructions prestored in the storage unit 106. In this way, it is possible to prevent illegal acts such as playing a prerecorded movie showing actions that correspond to the action instructions during a living-body determination process. Examples of actions to be instructed will be shown below from (1) to (5).

(1) "Blink slowly"
(2) "Slowly turn your head to the right (left)", and then "Come back slowly to the center and look forward"
(3) "Slowly look down (up)", and then "Come back slowly and look forward"
(4) "Tilt your head to the right (left)", and then "Straighten your head back"
(5) "Open your mouth wide", and then "Shut your mouth"

The living-body determination unit 404 captures a movie, by the camera 23, of the applicant who acts in response to the action instructions from the action instruction unit 403, and analyzes the captured movie to determine whether the applicant is a living body or not. The living-body determination unit 404 performs the living-body determination by checking if there are actions characteristic to a living body, such as swaying of eyes or opening or closing of eyes (blinking), while detecting the applicant's response by using face recognition technology. The living-body determination unit 404 stores a result of the determination into a predetermined folder (the storage unit 106).

The application image capture unit 405 captures with the camera 23 an application image that is to be used for the application procedure. When photographing, the application image capture unit 405 displays operation instructions on the operation panel 21 and outputs guidance voice sound, and then captures a portrait image (a still image) of the applicant at a predetermined timing. The application image capture unit 405 creates the application image by adding various processing, such as size adjustment, positioning, trimming, and background color setting, to the captured portrait image so as to make the image suit the usage. The application image capture unit 405 stores the captured application image into a predetermined folder (the storage unit 106).

The object detection unit 406 examines the application image captured in the application image capture unit 405, and detects if there is an object covering a face of the person to be photographed (the applicant). In this way, it is possible to detect illegal acts of impersonation, such as holding up someone else's portrait image (printed out paper or an output matter) in front of the face or holding up a tablet or the like displaying someone else's portrait image in front of the face. An example of a method for object detection by the object detection unit 406 is by an image processing for edge detection, in which the background color is subtracted from the wide-angle captured image before being trimmed to detect any unnatural corners, frames, or edges. The object detection unit 406 stores a result of the detection into a predetermined folder (the storage unit 106).

The same-person determination unit A407 compares the applicant's front face image that is cutout from the movie captured in the living-body determination process by the living-body determination unit 404 with the application image captured by the application image capture unit 405 to determine whether the photographed person is the same person in the movie or not. This can detect an illegal act of replacing the person to be photographed within a moment between the living-body determination process and the capturing of the application image. The same-person determination unit A407 stores a result of the determination in a predetermined folder (the storage unit 106).

The same-person determination unit B408 compares an image of a person read from the surface of the ID card by the reading device 31 and/or the camera 23, or, in a case in which the image of the person is stored in the IC chip, the image of the person contained in the information read from the IC chip, with the application image captured by the application image capture unit 405 to check whether the person in such the images is the same.

Furthermore, the same-person determination unit B408 also checks the applicant's front face image that is cutout from the movie captured in the living-body determination process by the living-body determination unit 404 to determine whether the person in all the images is the same. In this way, it can be verified that the image of the person on the surface of or contained in the IC chip on the ID card that is used for identification is an image of the applicant. The same-person determination unit B408 stores a result of the determination in a predetermined folder (the storage unit 106).

The same-person determination unit B408 is a function pertaining to a main point of the present invention.

The image determination unit 409 determines whether the application image captured by the application image capture unit 405 is photographed appropriately for the application procedure or not. This is a function for preventing any defects of the photograph. For example, specifications and precautions for passport application photographs are regulated in the international standards, and thus the captured image is determined if the photograph conforms to the standards. If a result of the determination shows that the captured application image is inappropriate, the image determination unit 409 attempts to capture a photograph again, or gives some advice about how to behave while being photographed. The image determination unit 409 stores the result of the determination in a predetermined folder (the storage unit 106).

The vision test unit 411 displays a vision test screen 71 on the operation panel 21 and carries out a vision test for the applicant. The vision test unit 411 displays a result of the measurement and stores the result in a predetermined folder (the storage unit 106).

The password information input unit 412 displays an input screen for setting password information necessary for the application procedure (a PIN, etc.). The password information entered by the applicant through the input screen, together with the application image, are stored in a predetermined folder (the storage unit 106), and then output to the server 5 by the data output unit 415.

The document scanner unit 413 reads a document that is to be used for the application procedure by using the document scanner 34, and stores the read data in a predetermined folder (the storage unit 106). The read data of the document together with the application image and the like are then output to the server 5.

The payment process unit 414 calculates a charge for using the photographing device 1 and receives money from the coin mechanism 22. The payment process unit 414 also calculates change and discharges the change from the coin mechanism 22. In a case of an IC card payment or a smartphone payment, the payment process unit 414 cooperates with a payment server for execution of the payment.

The data output unit 415 outputs the application image and attached information (the set password information, the scanned document data, and other information necessary for the application) to the server 5 if the identity verification unit 401 determines that the image of the person of the ID card matches the applicant, the authenticity determination unit 402 determines that the ID card is authentic, the living-body determination unit 404 determines that the applicant (the person to be photographed) is a living body, the same-person determination unit A407 and the same-person determination unit B408 determine that the captured movie, the still image, and the image on the ID card are of the same person, the object detection unit 406 determines that there is no object covering the face, and the image determination unit 409 determines that the application image is appropriate. It is preferable that the data output unit 415 outputs to the server 5 the application image and the attached information being linked to the unique ID that is linked to the authentication code. In this way, the information necessary for the application procedure is sent from the photographing device 1 to the server 5. The server 5 then sends such the information to a computer (a server) of an organization that processes the electronic application.

The data output unit 415 also outputs, together with the application image and the like, the determination result by the identity verification unit 401, the information read from the ID card, the determination result by the authenticity determination unit 402, the determination result by the living-body determination unit 404, the detection result by the object detection unit 406, the determination results by the same-person determination units A407 and B408, the determination result of the image determination unit 409, and the measurement result by the vision test unit 411 as the attached information being linked to the unique ID. In this way, it is possible to send to the server 5 information showing that identity is verified by the ID card, there is no forgery or alteration of the ID card, the applicant is a living body, the person on the ID card matches the person photographed on the application image and the person being determined in the living-body determination, the application image is appropriately photographed, etc.

Figure 5:
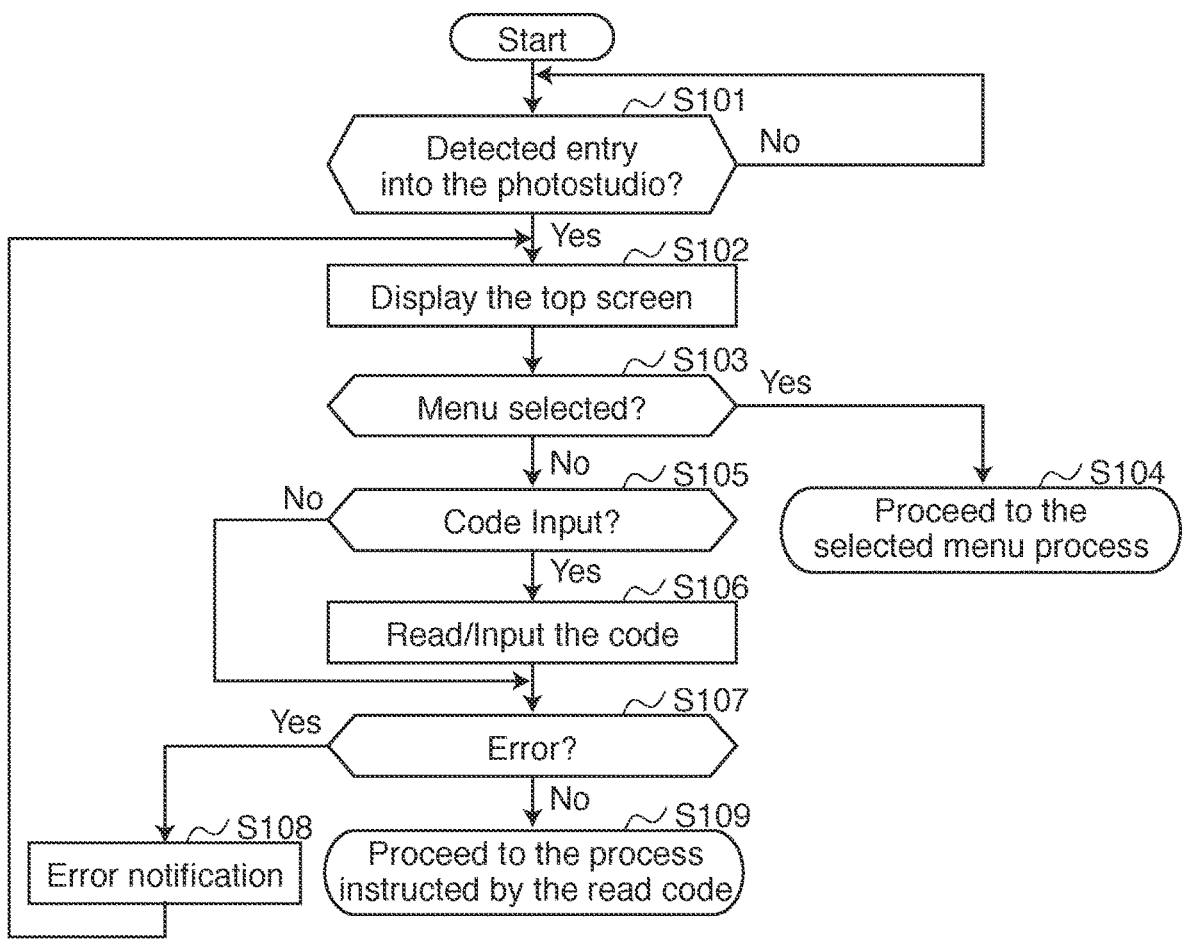
FIG. 5 is a flowchart showing a flow of a menu selection process executed by the photographing device 1.
Figure 6:
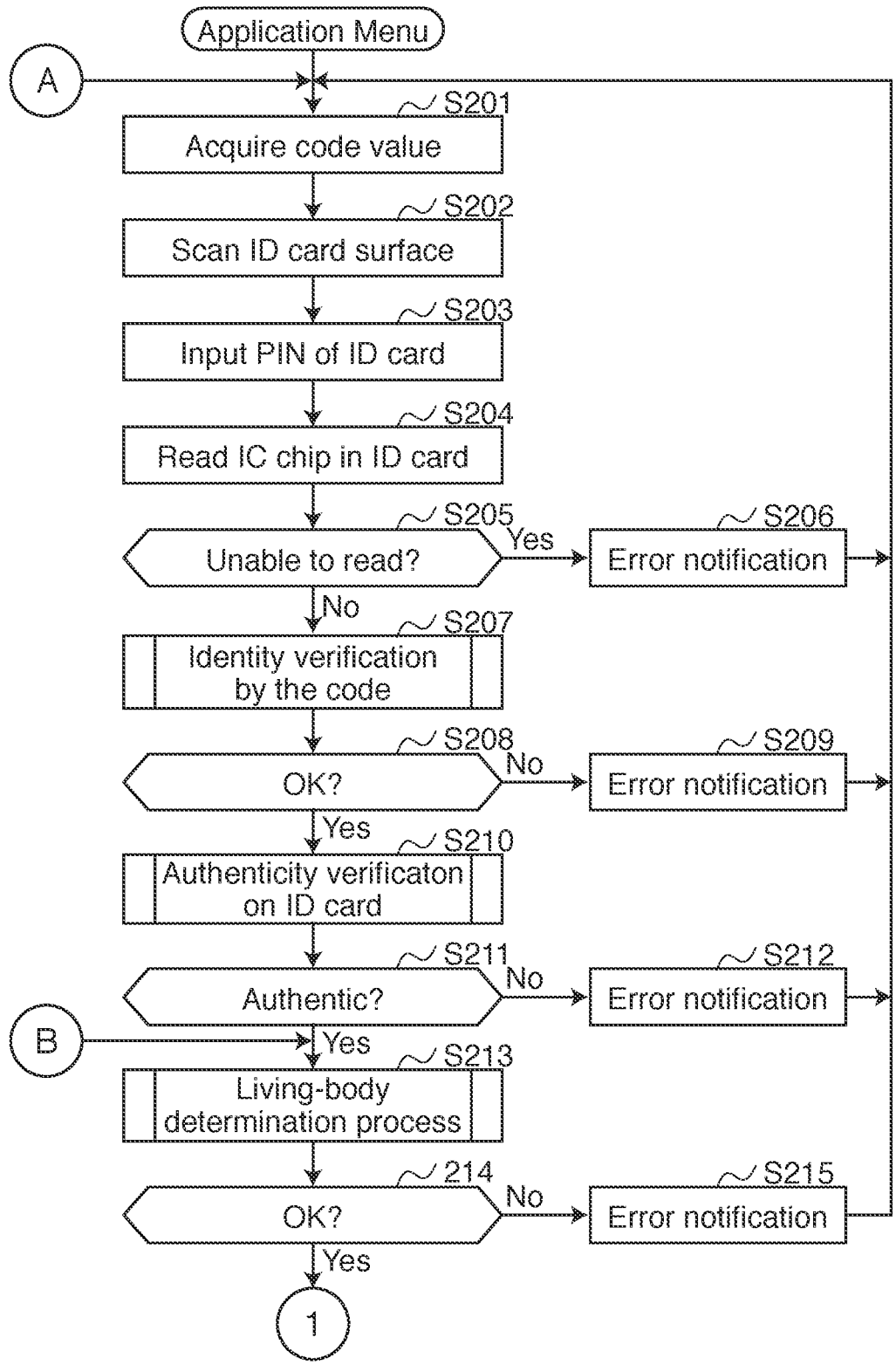
FIG. 6 is a flowchart showing a flow of an application menu process.

Next, flow of the processes executed by the photographing device 1 according to the present embodiment will be described. FIG. 5 is a flowchart showing a flow of a menu selection process in the photographing device 1, and FIG. 6 is a flowchart showing a flow of an application menu process.

When the subject sensor 29 detects an entry of a user (the person to be photographed/the applicant) into the photo studio (a step S101: YES), the control unit 101 of the photographing device 1 displays a top screen on the operation panel 21 (a step S102). The top screen is provided with buttons for selecting various services, such as an identification photographing service, an application service, and an image printing service.

When the user operates any one of the buttons and selects a service (a menu) to be executed (a step S103: YES), the control unit 101 transfers the process to the selected service (menu) (a step S104).

If the user already has the authentication code (a QR code or the like) (the step S103: NO), the user may enter the authentication code (a step S105) instead of operating the selection of the service (the menu) on the top screen.

The authentication code (a QR code, a bar code, or code information (number and character information) recorded on an IC card, a magnetic card, etc.) is linked to the unique ID issued by the server 5, and is issued if the user has accessed the server 5 from the user's own terminal 6 in advance, selecting the menu to be used on the photographing device 1, entering information required for identity verification, and entering information required for processing, and such the information has been registered on the server 5.

If the authentication code has been issued as a QR code, the user holds up the QR code to the code reader 35 (the step S105: YES) and the code reader 35 reads the QR code (a step S106). If reading of the QR code fails (a step S107: YES), the control unit 101 displays an error notification screen (a step S108) and returns the process to the top screen (a step S102). In the process of the step S106, instead of reading the QR code, an input of the authentication code through a software keyboard or an input of the authentication cord by using the IC card reader or a magnetic card reader may be accepted. When reading/entering the authentication code is completed (the step S107: NO), the control unit 101 accesses the server 5, acquires from the server 5 the registered information stored being linked to the read QR code (the authentication code), and transfers the process to a process menu that is designated by the registered information (a step S109).

In the present embodiment, the application menu will be described. When the application menu is selected in the process shown in FIG. 5, the control unit 101 executes an application menu process shown in FIG. 6.

Figure 7:
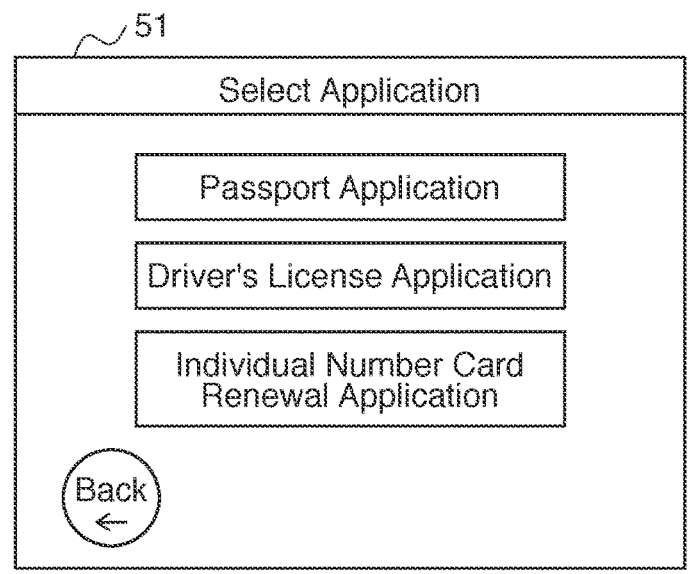
FIG. 7 is a view showing an example of an application contents selection screen 51.

FIG. 6 is a flowchart showing a flow of the application menu process. When the process is transferred to the application menu, firstly, the control unit 101 displays an application contents selection screen 51 on the operation panel 21 and waits for operations. FIG. 7 is a view showing an example of the application contents selection screen 51. As shown in FIG. 7, application contents that can be selected are shown on the application contents selection screen 51. In the example shown in FIG. 7, buttons for "Passport Application", "Driver's License Application", and "Individual Number Card Application" are displayed. The application contents are not limited to the above and may include applications for other identity verifying documents (resident cards, special permanent resident cards, etc.). Also, the application may be either a renewal application or a new application. However, only those of which electronic applications are officially permitted may be selectable.

Figure 8:
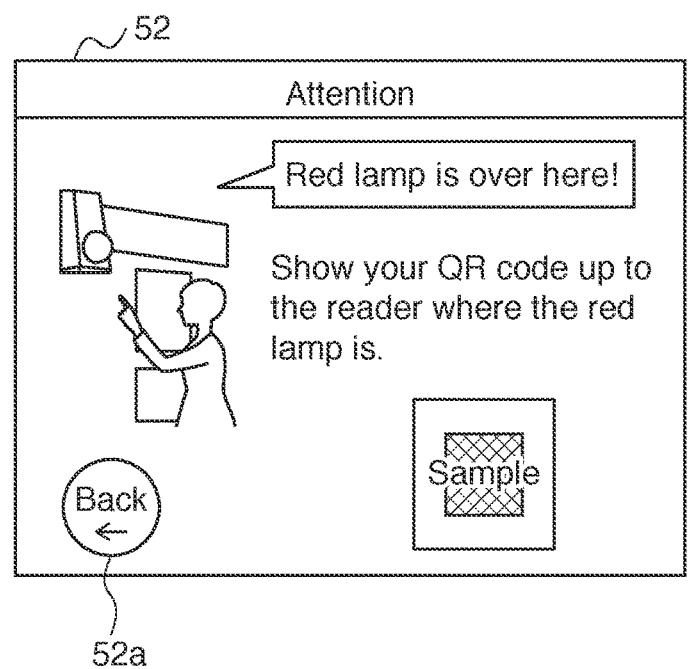
FIG. 8 is a view showing an example of a code reader instruction screen 52.
Figure 9:
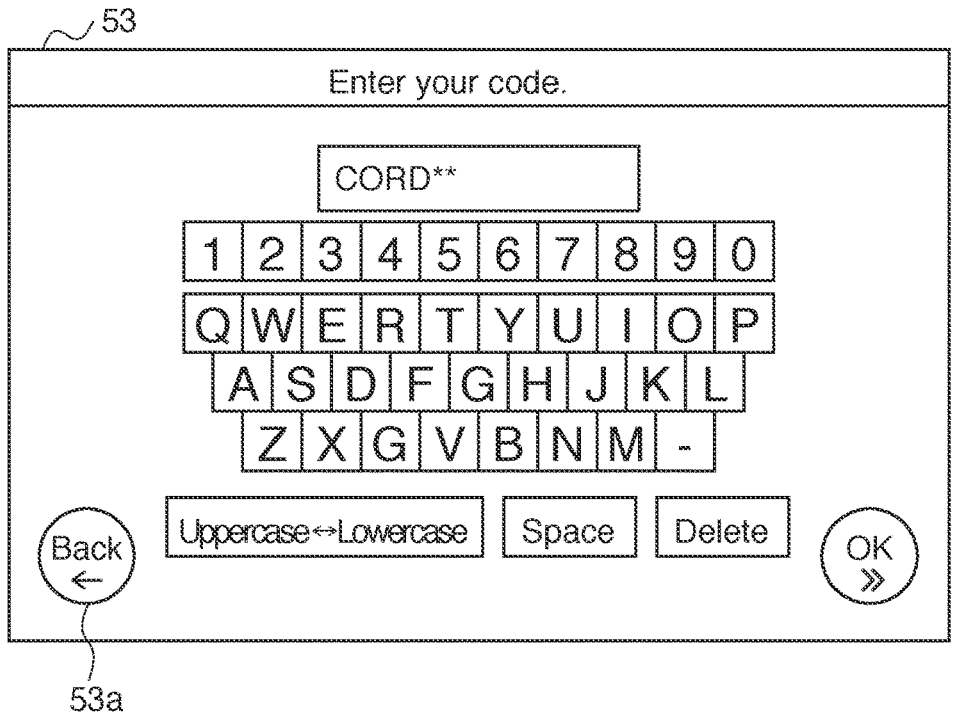
FIG. 9 is a view showing an example of a code input screen 53.
Figure 10:
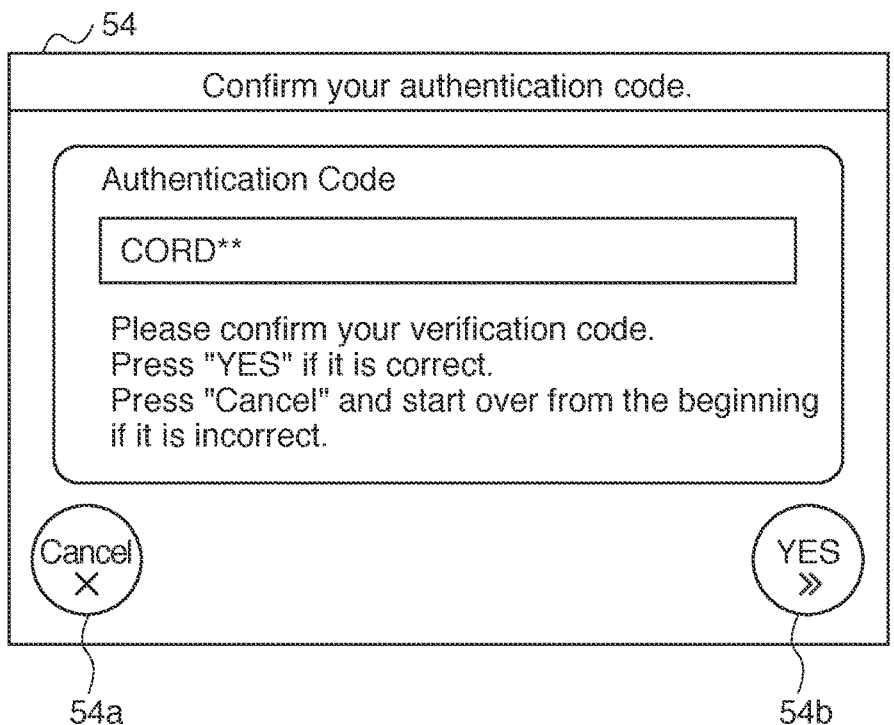
FIG. 10 is a view showing an example of a code confirmation screen 54.

When the user selects any one of the application contents on the application contents selection screen 51, the control unit 101 acquires a value of the authentication code (a step S201). If reading the QR code/entering the authentication code has been completed in the step S106 in FIG. 5, the control unit 101 acquires the read or entered code value (the unique ID). If the QR code has not been read or the authentication code has not been entered yet, the control unit 101 displays a code reader instruction screen 52 shown in FIG. 8 or the code input screen 53 shown in FIG. 9 on the operation panel 21, and reads the QR code or accepts inputs of the values of the authentication code. When the code value (the unique ID) is read or entered, the control unit 101 displays a code confirmation screen 54 shown in FIG. 10. If a "Yes" button 54b is selected on the code confirmation screen 54, the process is transferred to a step S202 in FIG. 6. Note that if any of "Back" buttons 52a, 53a and a cancel button 54a is operated in any of the screens shown in FIG. 8 to FIG. 10, the process returns to the application contents selection screen 51.

Next, the photographing device 1 reads the information on the user's ID card. More specifically, the photographing device 1 scans a surface of the ID card by using the surface scanner 32 of the reading device 31 (a step S202), and also reads the data recorded on the IC chip on the ID card by using the IC chip reader 33 (a step S204). Note that the scanning in the step S202 may be common image scanning using white light, or UV/IR image scanning using ultraviolet rays (UV) or infrared rays (IR). Also, instead of scanning the surface by the reading device 31, the camera 23 may be used to photograph the surface (the front and back faces) of the ID card, or the IC card reader may be used to read the data recorded on the IC chip on the ID card. Also, photographing of the surface by the camera 23 and reading of the IC chip by the IC card reader may be combined to read the information on the ID card. Also, in a case of a driver's license, for example, in which the IC chip has a memory region that is protected by password information (a PIN or the like) (the locked memory region), an input of the password information is accepted (a step S203) and the data stored in the free memory region as well as in the locked memory region are read (a step S204). If the IC chip has no memory region that is protected by password information (the locked memory region) or the user enters no password information, then only the data stored in the free memory region is read in the step S204.

If it is unable to read the information from the IC chip (a step S205: YES), there is a possibility that the ID card is forged or altered. Thus, an error is notified (a step S206), and then the process returns to the application contents selection screen 51. If the information is read from the IC chip (the step S205: NO), the process proceeds to a step S207.

Figure 11:
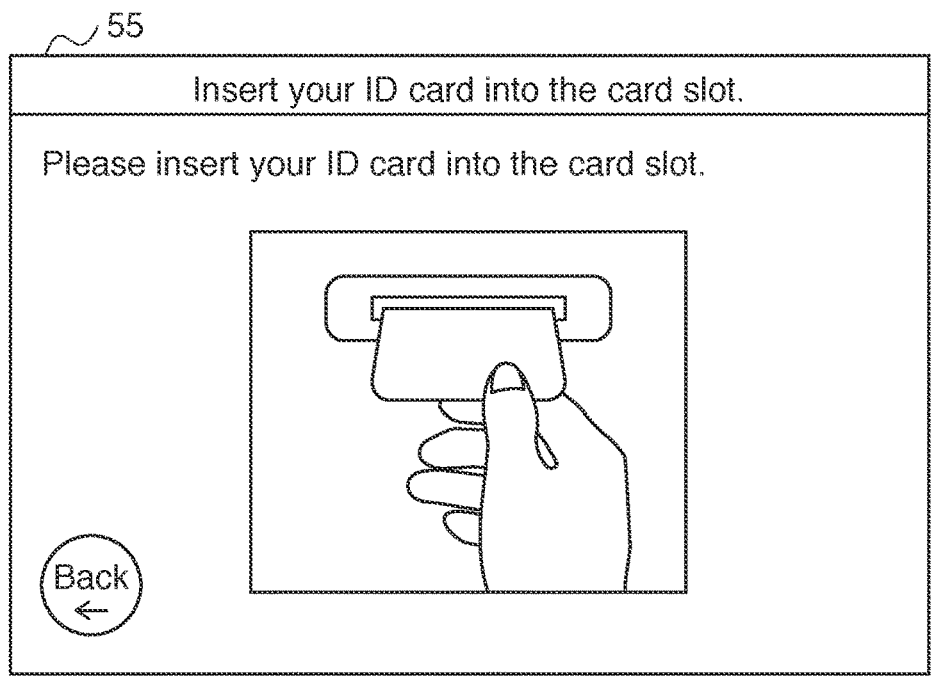
FIG. 11 is a view showing an example of an ID card insertion instruction screen 55.
Figure 12:
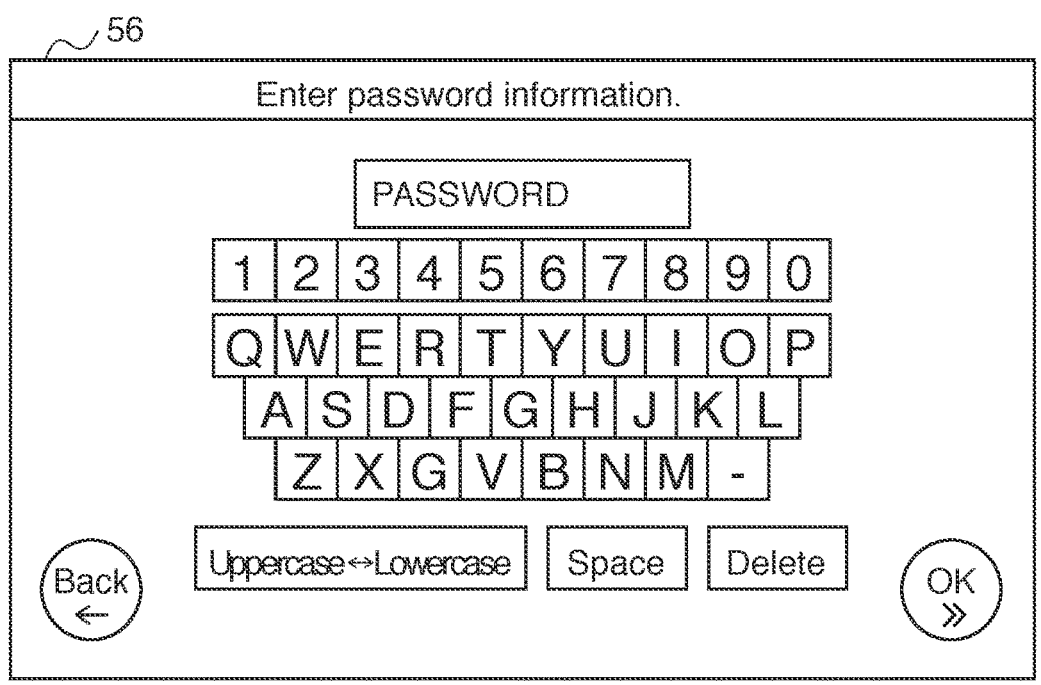
FIG. 12 is a view showing an example of a password information input screen 56 for the ID card.

Note that, in the step S202, the control unit 101 may display on the operation panel 21 an ID card insertion instruction screen 55 shown in FIG. 11. Also, in the step S203, the control unit 101 displays on the operation panel 21 a password information input screen 56 shown in FIG. 12.

After reading the information on the ID card through the processes from the step S202 to the step S204 (the step S205: NO), the control unit 101 executes the identity verification process using the code value (the unique ID) acquired in the step S201 (the step S207).

Figure 13:
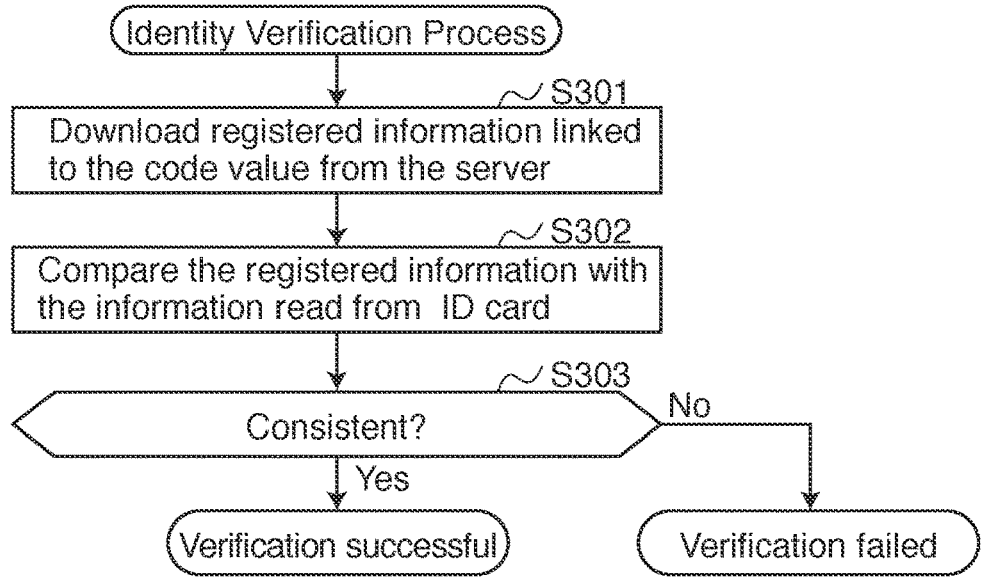
FIG. 13 is a flowchart showing a flow of an identity verification process.

FIG. 13 is a flowchart showing a flow of the identity verification process of the step S207. As shown in FIG. 13, the control unit 101 firstly downloads from the server 5 the registered information linked to the code value (the unique ID) that has been acquired in the step S201 (a step S301). If downloading of the registered information has already been completed by the code reading process in the step S106 shown in FIG. 5 and the registered information is stored in the RAM 105 or the storage unit 106 of the photographing device 1, the control unit 101 acquires the registered information from the RAM 105 or the storage unit 106.

The control unit 101 compares the acquired registered information with the information read from the ID card (a step S302), and determines whether there is inconsistency in the contents of the information or not (a step S303). For example, the control unit 101 executes an OCR (optical character recognition) process on the surface information read from the ID card to acquire the character and numerical information such as name and date of birth. If the name and the date of birth written on the surface of the card match the information of the name and date of birth contained in the registered information, the control unit determines that there is no inconsistency (the step S303: YES) and the verification is a success. If there is inconsistency between any of the name and the date of birth written on the surface of the card and the information of the name and date of birth contained in the registered information, then the control unit determines that there is inconsistency (the step S303: NO) and the verification is a failure. Items that are to be compared in the step S302 are not limited to the name and date of birth, and the comparison may be based on the date of issuance and expiration date of the ID card, information stored in the IC chip, and the like. Also, the comparison may be based on the portrait image on the ID card. In such cases, the equivalent information (the date of issuance, expiration date, portrait image, etc.) must be registered in the registered information in advance.

Figure 14:
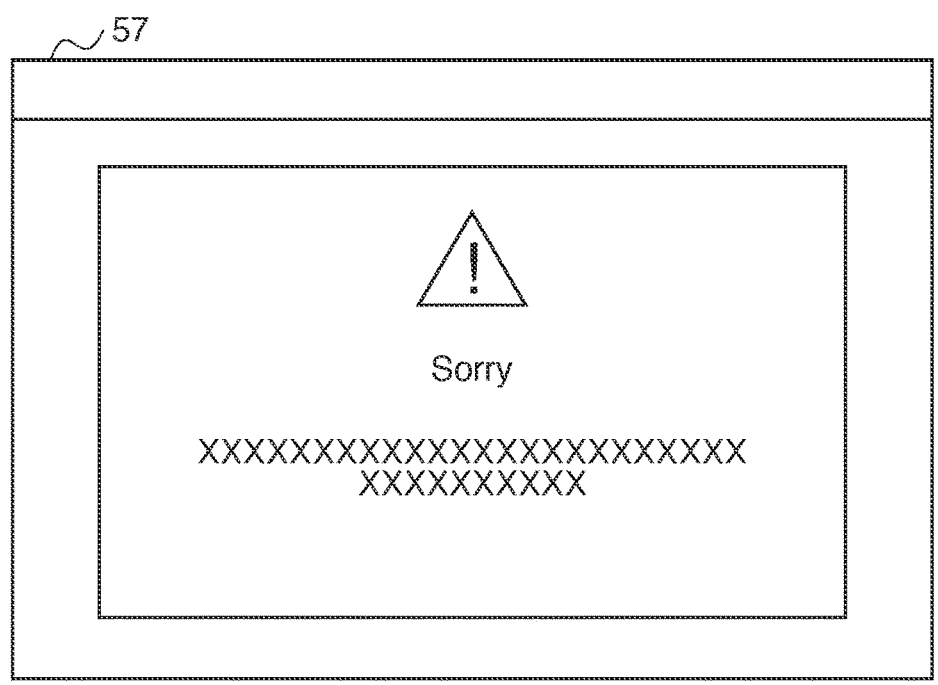
FIG. 14 is a view showing an example of an error notification screen 57.

The control unit 101 acquires a result of the identity verification process, and if the verification is a failure (the step S208 in FIG. 6: NO), the control unit 101 displays an error notification screen 57 as shown in FIG. 14 (a step S209) and then the process returns to the application contents selection screen 51. On the error notification screen 57, a description of the error (e.g., "The registered information does not match the information on the ID card", etc.) is shown. If the verification is a success (the step S208: YES), the control unit 101 stores the result of the identity verification process (the identity verification process "OK") into the folder in which the registered information is registered, and proceeds the process to a step S210.

In the step S210, the control unit 101 executes an authenticity determination process on the ID card (the step S210).

Figure 15:
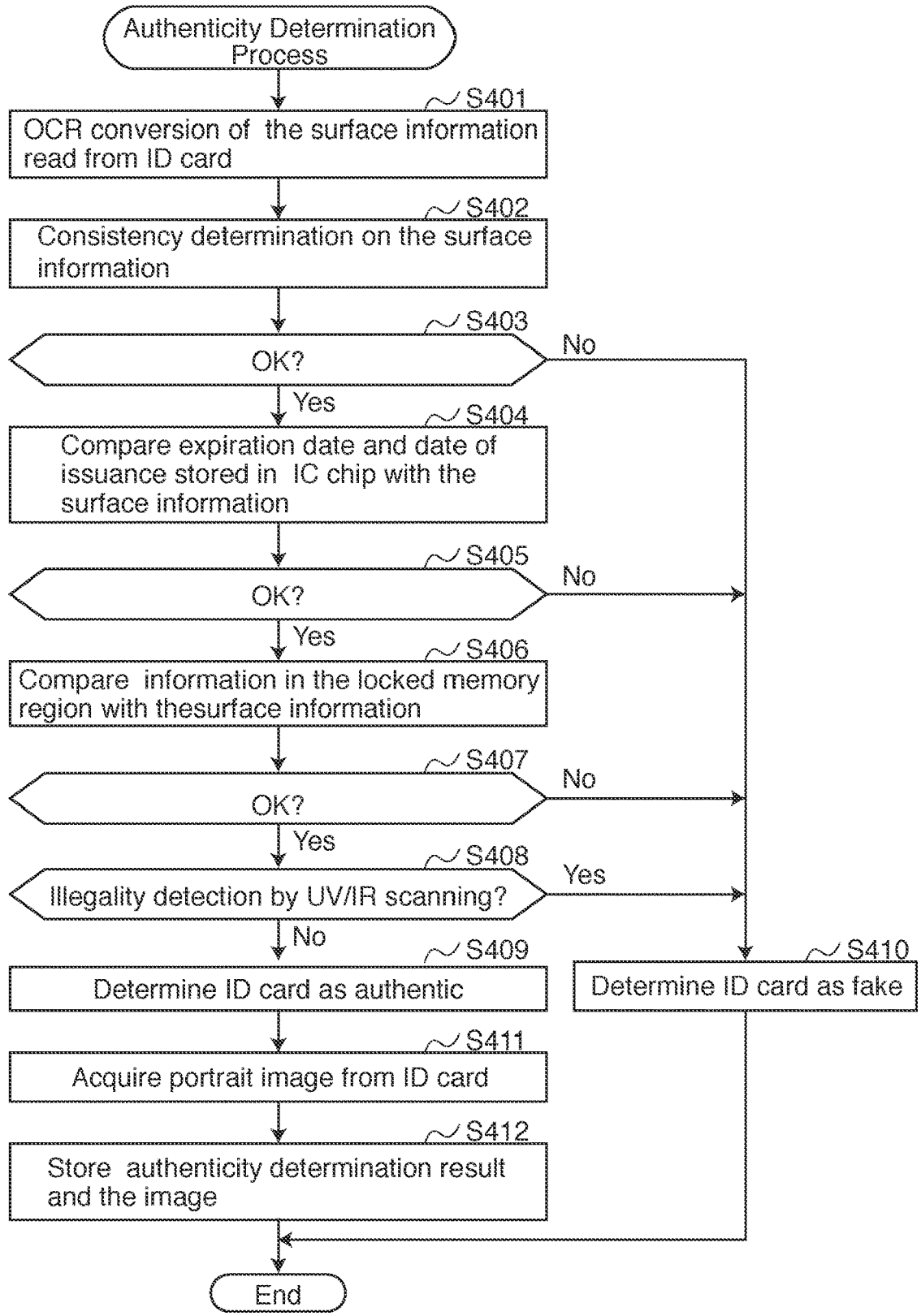
FIG. 15 is a flowchart showing a flow of an authenticity determination process.

FIG. 15 is a flowchart showing a flow of the authenticity determination process.

Although there are various methods of the authenticity determination process for the ID card, an example thereof in which the authenticity is determined by detecting obvious inconsistency based on the surface information, the surface image, and the IC chip information read by the reading device 31, the camera 23, the IC card reader, and the like will be described here.

The control unit 101 executes an OCR process on the image information of the surface read from the ID card by using the surface scanner 32 and the camera 23 of the reading device 31 (a step S401), and determines if there is inconsistency in the surface information. The determination of inconsistency of the surface information is disclosed in Patent Document 1, for example. More specifically, if the ID card is a driver's license, for example, the control unit 101 scans and performs OCR to acquire the name, date of birth, address, date of issuance and expiration date of the ID card, and name of the issuer written on the ID card surface, and determines if there is inconsistency between the contents of certain character information and the contents of the other character information, or if there is inconsistency between the contents of certain character information and attributes of the said character information on the ID card. For example, if it is prescribed by law that the expiration date of the ID card should fall on a date that is exactly one month later than the date of birth, a forgery such as adding a number "2" by using a pen etc. to the date of birth "Jun. 1, 1975" so as to be altered to "Jun. 21, 1975", for example, is to be determined that there is inconsistency between the date of birth and the expiration date (the day and month of the date of expiration do not fall on the day and month of the following month of the date of birth). Also, if the date of birth written is not possible in any way, e.g., year of Showa 70, or month 13, etc., then it is determined that there is consistency in the content.

If no inconsistency is detected from the surface information, the process is determined as "OK" (a step S403: YES) and the control unit 101 compares the information stored in the IC chip on the ID card (date of expiration and issuance, for example) with the information acquired from the surface information (date of expiration and issuance) (a step S404). If a comparison result shows a match, it is determined as "OK" (a step S405: YES). Next, the control unit 101 compares the information stored in the locked memory region of the IC chip on the ID card (name, date of birth, address, etc.) with the information acquired from the surface information (name, date of birth, address, etc.) (a step S406). If a comparison result shows a match, it is determined as "OK" (a step S407: YES). Next, the control unit 101 determines whether there is an illegality in the ID card or not from a UV/IR scanning result of the ID card surface (a step S408). Sometimes, UV/IR scanning can detect a trace of replacement or the like of the surface of the card. If no illegality is detected from the result of the UV/IR scanning, the ID card is determined as "authentic" (a step S409). If any of the determinations and comparisons in the steps S402, S404, and S406 results in failure ("NO" in any of the steps S403, S405, and S407), or if illegality is detected by the UV/IR scanning (the step S408: YES), the control unit 101 determines that the ID card is "fake" (a step S410).

If the ID card has no locked memory region in the IC chip or it is unable to read the information stored in the locked memory region, the control unit 101 may skip the processes from the step S406 to the step S407. Also, if the reading device 31 has no UV/IR scanning function, the process in the step S408 may be skipped.

Next, the control unit 101 acquires the portrait image that is read by the reading device 31 or the camera 23 from the surface of the ID card or that is recorded in the IC chip (a step S411), and stores the acquired portrait image and the result of authenticity determination from the steps S409 and S410 (authentic or fake) in a predetermined folder in the storage unit 106 (a step S412). This completes the authenticity determination process of the ID card.

If the ID card is determined as "fake" as a result of the authenticity determination in FIG. 15 (the step S410 and the step S211 in FIG. 6: NO), the control unit 101 displays the error notification screen 57 as shown in FIG. 14 (the step S212), and then returns the process to the application contents selection screen 51. On the error notification screen 57, a description of the error (e.g., "Inconsistency is found in the items mentioned on the ID card", or "Illegality is found on the ID card", etc.) is shown. If the ID card is determined as "authentic" (the step S211: YES), the process is transferred to a process in a step S213.

In the step S213, the control unit 101 executes the living-body determination process to determine whether the person to be photographed (the applicant) is a living body or not (the step S213).

Figure 16:
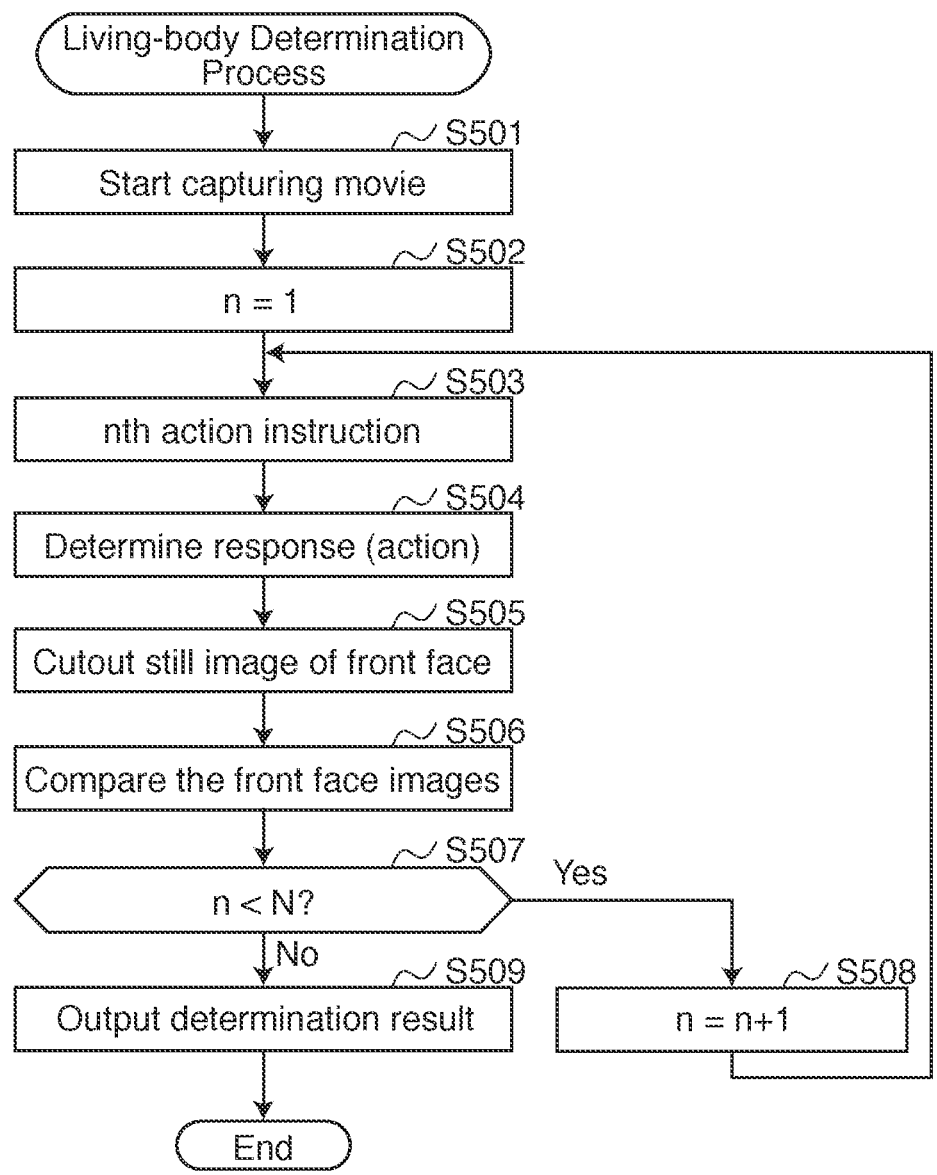
FIG. 16 is a flowchart showing a flow of a living-body determination process.

FIG. 16 is a flowchart showing a flow of the living-body determination process. In the living-body determination process, the control unit 101 captures a movie of the person to be photographed (the applicant) by using the camera 23 (a step S501). The control unit 101 also sets a counter n to an initial value "1" (a step S502), and instructs nth action (a step S503).

Figure 17:
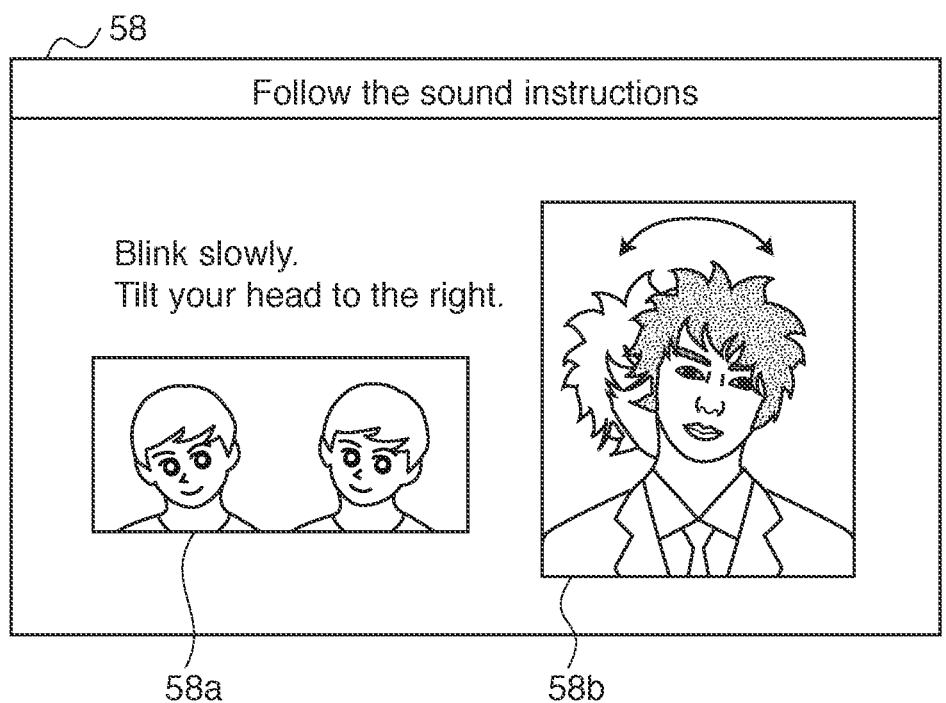
FIG. 17 is a view showing an example of an action instruction screen 58.

In the step S503, the control unit 101 acquires action instruction data that has been prestored in the storage unit 106 and gives action instructions among a plurality of the action instructions for a predetermined number of times (N times) in a random order. This is to prevent illegal acts, such as playing a prerecorded movie on a tablet terminal showing actions that correspond to the action instructions, which may happen if the order of the actions is always the same. In the step S503, the control unit 101 displays on the operation panel 21 an action instruction screen 58 as shown in FIG. 17 to show action instruction contents by means of animations and letters in an instruction description presentation area 58a on the screen, or outputs voice sound of the action instructions.

The person to be photographed responding to the action instructions is recorded in a movie, which is simultaneously shown on a movie displaying area 58b on the action instruction screen 58. The control unit 101 examines the response (actions) recorded in the movie, analyzes the image to examine if the actions correspond to the action instructions and to detect any actions characteristic to a living body (swaying of eyes, blinking, or the like), and determines whether the person to be photographed is a living body or not (a step S504). Also, at the time of detecting the response, the control unit 101 cuts out a front face image from the movie and saves the image as a still image in the RAM 105 or in a predetermined folder in the storage unit 106 (a step S505). The saved front face image is then compared with front face images acquired when the person responds to the next and following action instructions (a step S506).

The control unit 101 compares the value of the counter n with the predetermined max value N. If n<N (a step S507: YES), the control unit 101 increments the value of the counter n (n+1) (a step S508), returns the process to the step S503, and instructs the next action. The control unit 101 repeats the processes in the steps S503 to S506 for N times. In this way, results of the living-body determinations for N times action instructions and a result of front face image comparison for each time can be obtained. When the N times of processes are completed (the step S507: NO), the control unit 101 outputs a result of the determination (a step S509).

If, as a result of the living-body determination process, no living-body characteristics are detected in the person to be photographed or the front face images acquired from the action instructions do not match one another, then the control unit 101 determines the process as "NG". In such the case (a step S214 in FIG. 6: NO), the process proceeds to a step S215 to display the error notification screen 57 as shown in FIG. 14 (the step S215), and then returns to the application contents selection screen 51. The error notification screen 57 in the step S215 shows a description of the error (e.g., "There are some problems in the actions" etc.).

If, as a result of the living-body determination process, living-body characteristics are detected in the person to be photographed and the front face images acquired from the action instructions match one another, then the control unit 101 determines the process as "OK" (the step S214 in FIG. 6: YES), and the process proceeds to a step S216 shown in FIG. 18.

Figure 18:
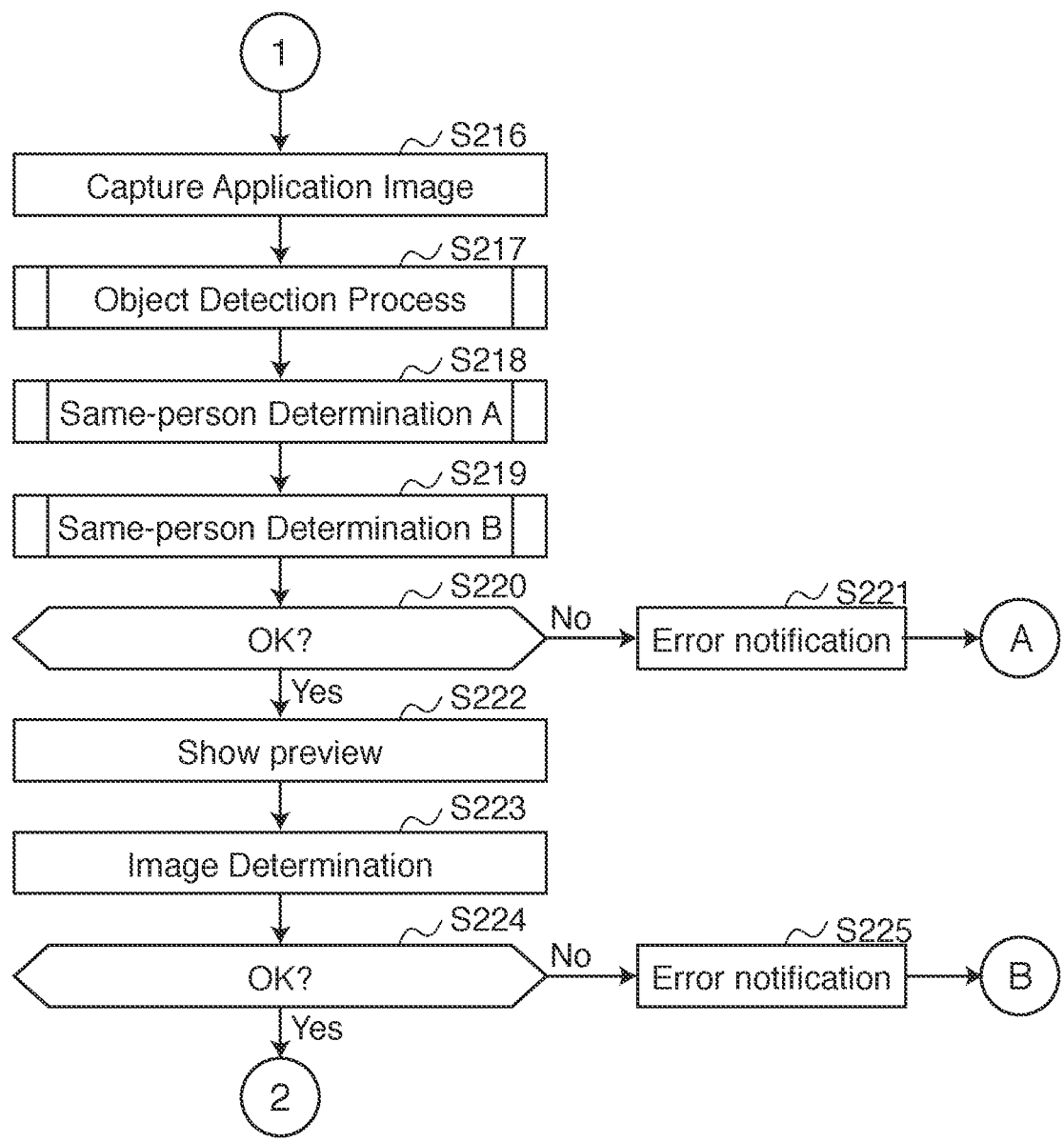
FIG. 18 is a flowchart showing a flow of a process continued from FIG. 6 (the application menu process).
Figure 19:
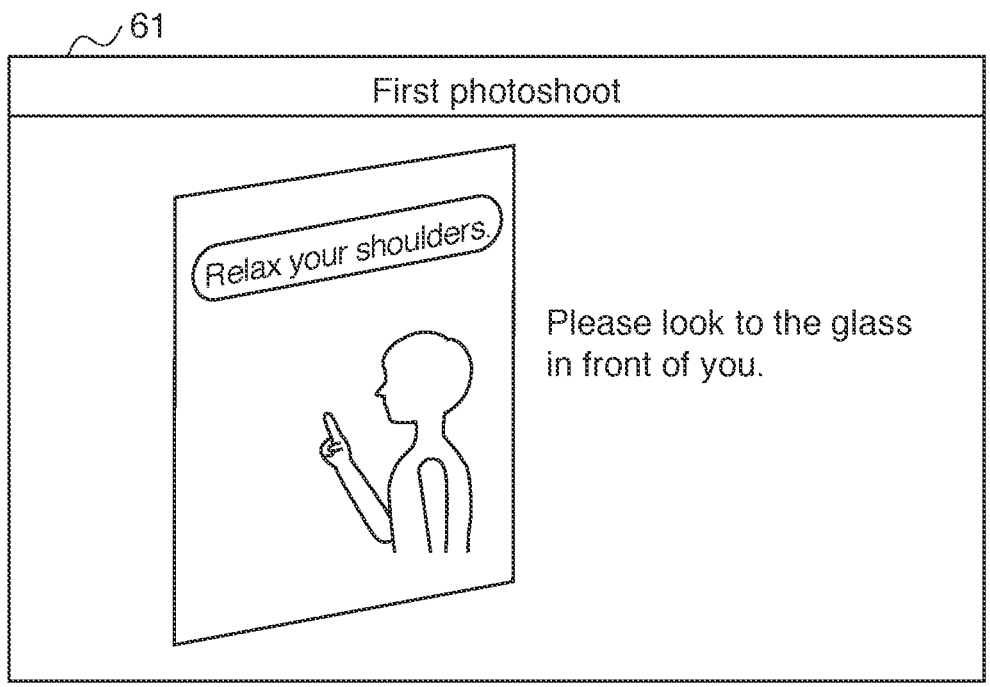
FIG. 19 is a view showing an example of an application image photographing screen 61.
Figure 20:
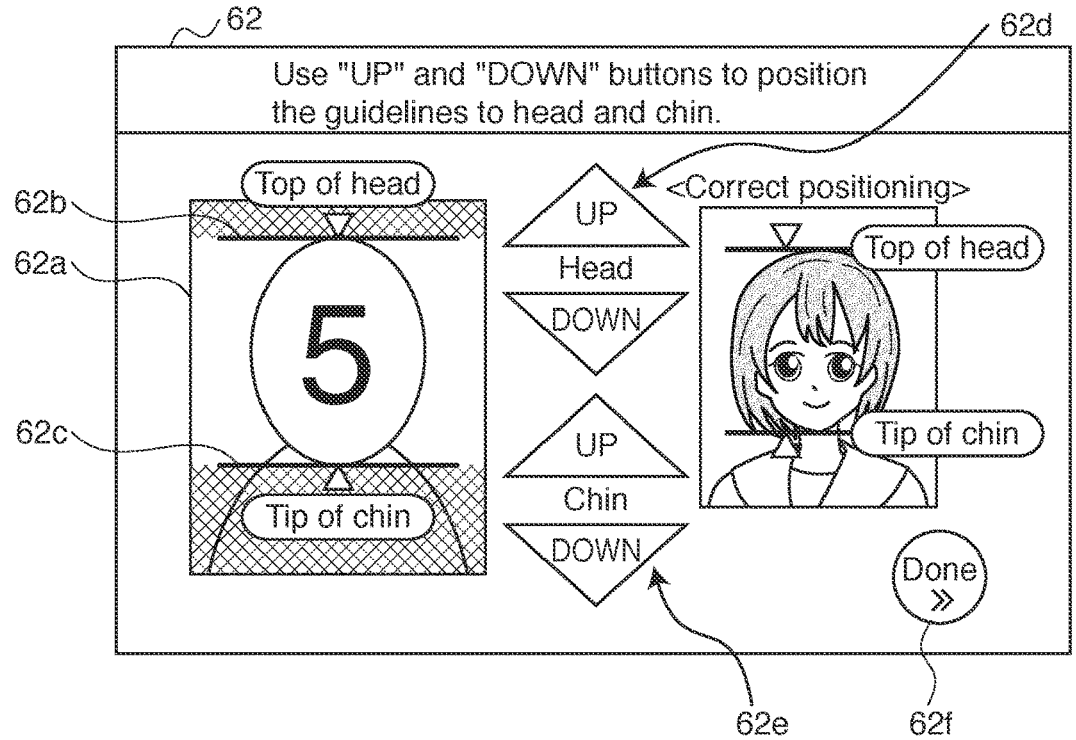
FIG. 20 (a) and FIG. 20 (b) are views showing examples of operation screens 62 and 63 for photography positioning.
Figure 20:
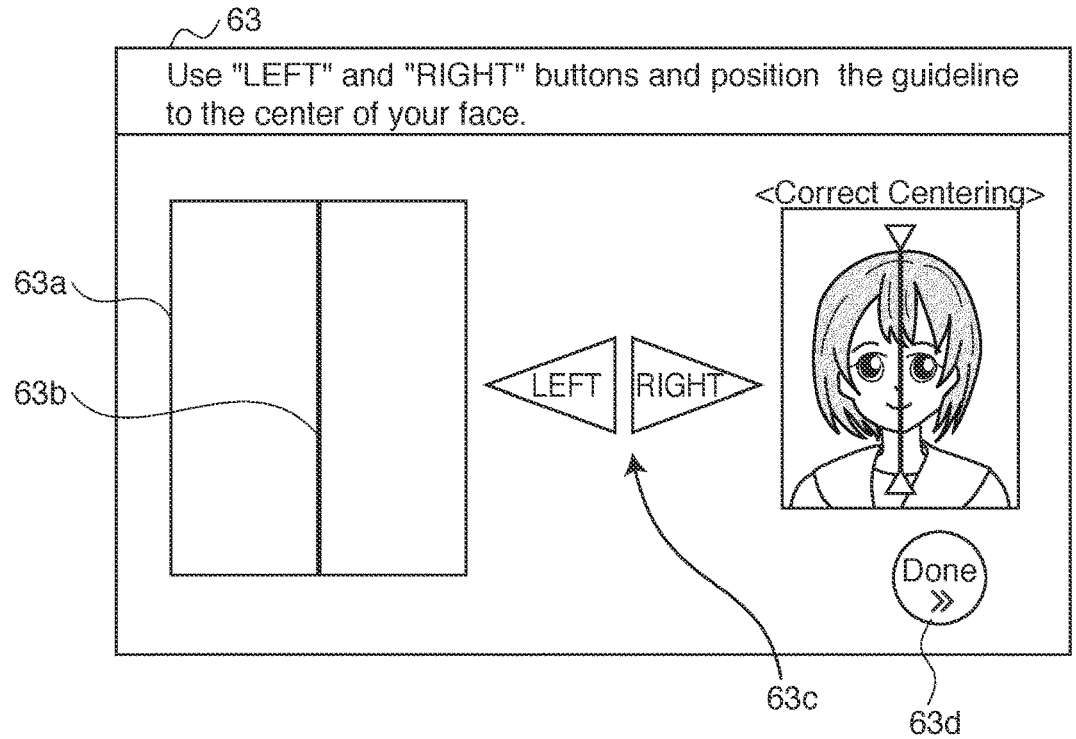

FIG. 18 is a flowchart showing a flow continued from FIG. 6 (the application menu process). The control unit 101 executes a photographing process of the application image in the step S216. The application image is a photograph that is to be submitted at a time of application of a passport, a driver's license, an individual number card, etc. In the photographing process of the application image, the control unit 101 displays an application image photographing screen 61 as shown in FIG. 19 and operation screens 62 and 63 as shown in FIG. 20 to provide instructions for photographing and positioning of the face or the like. For example, before starting photographing, the control unit 101 displays the application image photographing screen 61 as shown in FIG. 19 on the display panel 21 and outputs a guidance sound such as "Please look to the front glass" from the sound output unit 27. After that, the control unit 101 captures a still image of the person to be photographed (the applicant) by using the camera 23 and stores the image in the RAM 105 or in a predetermined folder in the storage unit 106. The image is captured at a wide angle with the face in the center, and the size and positioning are adjusted according to the photograph size in the following steps. The photographing may take place a plurality of times.

FIG. 20 (*a*) is the operation screen 62 for adjusting a vertical position of the face, and FIG. 20 (*b*) is the operation screen 63 for adjusting a horizontal position of the face. On the operation screen 62 in FIG. 20 (*a*), a preview image 62*a* is shown with guidelines 62*b* and 62*c* for showing a top position of the head and a tip position of a chin, respectively. Also, up-and-down buttons 62*d* and 62*e* for vertically moving the guidelines 62*b* and 62*c*, respectively, are provided. When a set button 62*f* is operated, the operation screen 63 shown in FIG. 20 (*b*) is then displayed. On the operation screen 63 in FIG. 20 (*b*), a preview image 63*a* is shown with a guideline 63*b* for showing a center position of the face. Also, left-and-right button 63*c* for horizontally moving the guideline 63*b* is provided. When a set button 63*d* is operated, the horizontal center position of the face is decided. The control unit 101 then creates the application image having a size that suits the application content.

Figure 21:
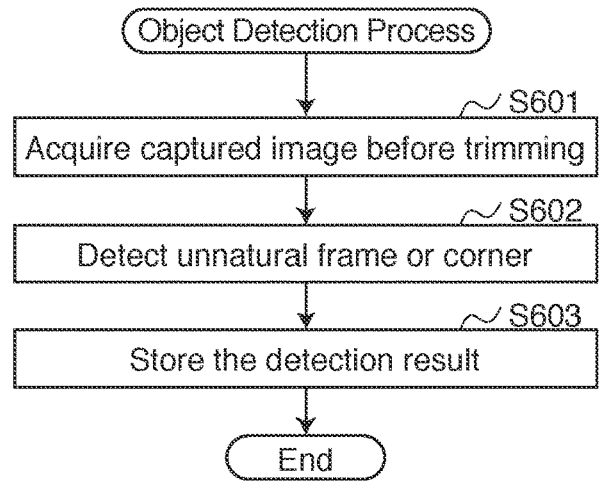
FIG. 21 is a flowchart showing a flow of an object detection process.
Figure 22:
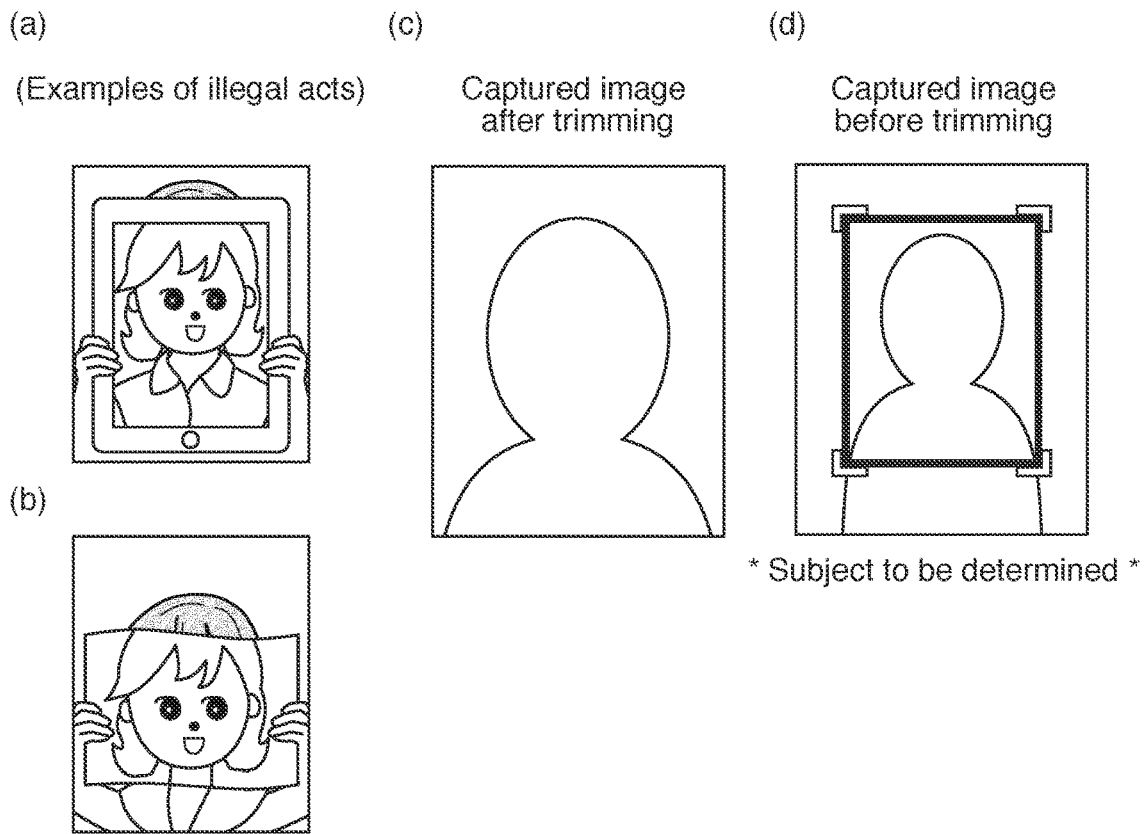
FIG. 22 (a), FIG. 22 (b), FIG. 22 (c), and FIG. 22 (d) are views illustrating illegal acts of face covering and the object detection process.

Next, the control unit 101 executes an object detection process (a step S217). The object detection process is a process for determining whether there is an object covering the face of the person to be photographed (the applicant). FIG. 21 is a flowchart showing a flow of the object detection process, and FIG. 22 (*a*) to FIG. 22 (*d*) are views illustrating illegal acts of face covering and the object detection process. There is a possibility of an illegal act in photographing, such as impersonating someone else by holding up someone else's portrait image shown on a tablet or on a printed matter in front of the face as shown in FIG. 22 (*a*) and FIG. 22 (*b*). To prevent such illegal acts, the photographing device 1 executes the object detection process.

As shown in the flowchart in FIG. 21, the control unit 101 acquires an image before trimming the application image that has been captured in the step S214 (a step S601). The application image is captured at a wide angle as shown in FIG. 22 (*d*) at first and then trimmed as shown in FIG. 22 (*c*). The control unit 101 examines the image before trimming acquired in the step S60 land detects from the image any unnatural frames, corners, or edges (a step S602). An example process in the step S602 is an edge detection process, in which the background color is subtracted from the captured image and edges are detected in the subtracted image. If unnatural frames, corners, or edges are detected, it means that an object in front of the face is detected, and thus it is determined as "NG". If unnatural frames, corners, or edges are not detected, it means that an object in front of the face is not detected, and thus it is determines as "OK". The control unit 101 stores a result of the detection into the RAM 105 or in a predetermined folder in the storage unit 106 (a step S603).

Figure 23:
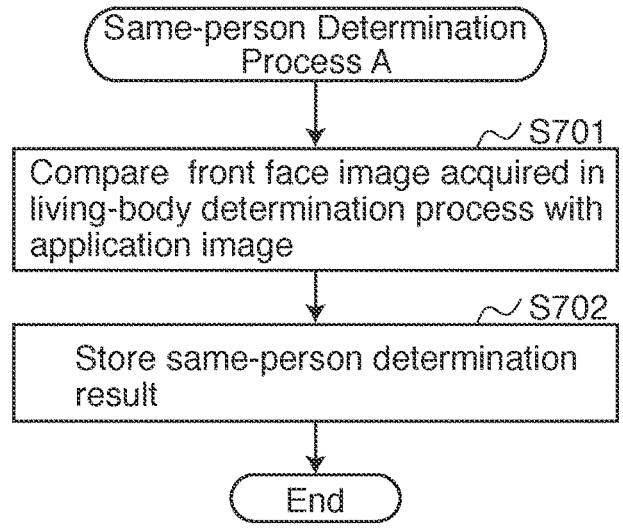
FIG. 23 is a flowchart showing a flow of a same-person determination process A.

Next, the control unit 101 executes a same-person determination process A (a step S218 in FIG. 18). FIG. 23 is a flowchart showing a flow of the same-person determination process A. In the same-person determination process A, the control unit 101 compares the front face image that has been cutout from the movie captured in the living-body determination process in the step S211 with the application image captured in the step S216, so as to determine whether the person being photographed is the same person or not (a step S701). The control unit 101 executes a face recognition process, and determines that it is "OK" if the person in the front face image matches the person in the application image. The control unit 101 determines that it is "NG" if the person in the front face image does not match the person in the application image. The control unit 101 stores a result of the determination into the RAM 105 or in a predetermined folder in the storage unit 106 (a step S702).

Figure 24:
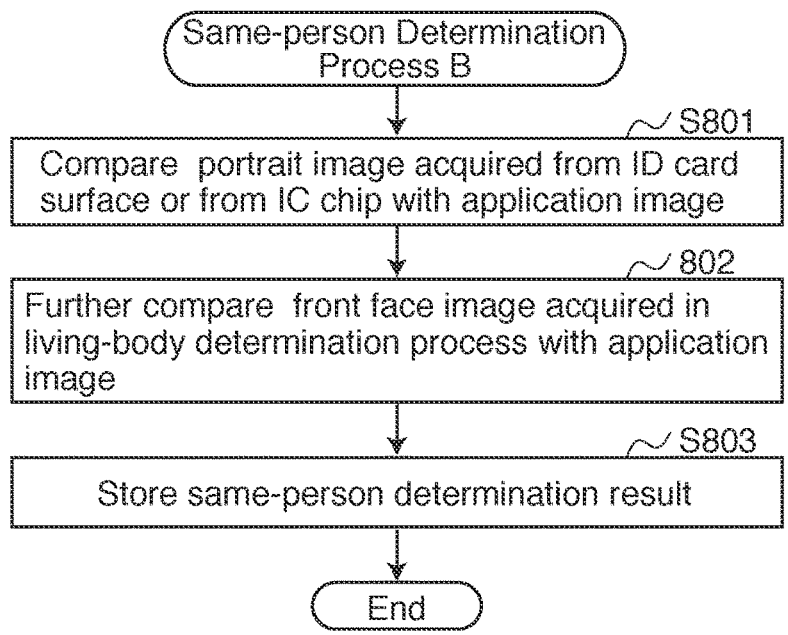
FIG. 24 is a flowchart showing a flow of a same-person determination process B.

Next, the control unit 101 executes a same-person determination process B (a step S219 in FIG. 18). FIG. 24 is a flowchart showing a flow of the same-person determination process B. In the same-person determination process B, the control unit 101 compares the portrait image that is on the surface and contained in the IC chip on the ID card that has been acquired in the steps S202 to S204 (hereinafter, referred to as an ID card face image) with the application image captured in the step S214, so as to determine whether the person being photographed is the same person or not (a step S801). Furthermore, the control unit 101 compares the front face image that has been cutout from the movie captured in the living-body determination process in the step S211 with the ID card face image and the application image, so as to determine whether the person being photographed is the same person or not (a step S802). The control unit 101 executes a face recognition process, and determines that it is "OK" if the person in the ID card face image matches the person in the application image as well as the person in the front face image. It is determined as "NG" if any of the persons in the images do not match one another. The control unit 101 stores a result of the determination into the RAM 105 or in a predetermined folder in the storage unit 106 (a step S803).

After completing the processes in the steps S217 to S219 (the object detection process, the same-person determination process A, and the same-person determination process B), the control unit 101 acquires the results of the processes ("OK" or "NG") stored in the RAM 105 or the predetermined folders in the storage unit 106. If there is an "NG" in any of the processes (a step S220: NO), the control unit 101 displays the error notification screen 57 as shown in FIG. 14 (a step S221), and then returns the process to the application contents selection screen 51. The error notification screen 57 in the step S221 shows a description of the error (e.g., "There are some problems in the captured image" etc.).

If the results of the object detection process, the same-person determination process A, and the same-person determination process B are all "OK" (the step S220: YES), the process proceeds to a step S222.

The control unit 101 shows a preview of the application image captured and created in the step S216 (the step S222), and executes an image determination process (a step S223). In the image determination process in the step S223, the control unit 101 determines whether the application image is an appropriate image for the application procedure. A method for determination is, for example, to set a plurality of items to be determined in advance in the storage unit 106 and to make a determination of "OK" or "NG" on each of the items. The items to be determined may include, for example, if the background includes any patterns or not, if the background color is appropriate or not, if the boundary between the person and the background is clear or not, if the pupils of the eyes are photographed as red or not, if the lighting is reflected by the glasses or not, if there is a shade on the face or not, if there is a shade on the background or not, if there are any blurs or out of focus in the photo or not, and if there are any reflections or uneven parts in the photo or not. The followings may be also detected: the head is tilted to the left or to the right, the person is facing to the side, the position is not at the center, the head is covered by a hat or a wide headband, accessories or the like cover any of the organs of the face or the head, the outline of the face is hidden, the hair hangs over the eyes, color contacts are worn, colored glasses, sunglasses or frames of the glasses hang over the eyes, and the like. If any of the items is determined as "NG" (a step S224: NO), the error notification screen 57 is displayed (a step S225), and then the process is returned to the living-body determination process (capturing the movie) in the step S213 (FIG. 6). The error notification screen 57 in the step S225 shows a description of the error (e.g., "There are some problems in the captured image" etc.) or descriptions of the items that have been determined as "NG", giving some advice about how to behave while being photographed. If all the items to be determined in the image determination process are "OK" (the step S224: YES), the process proceeds to a step S226 shown in FIG. 25.

Figure 25:
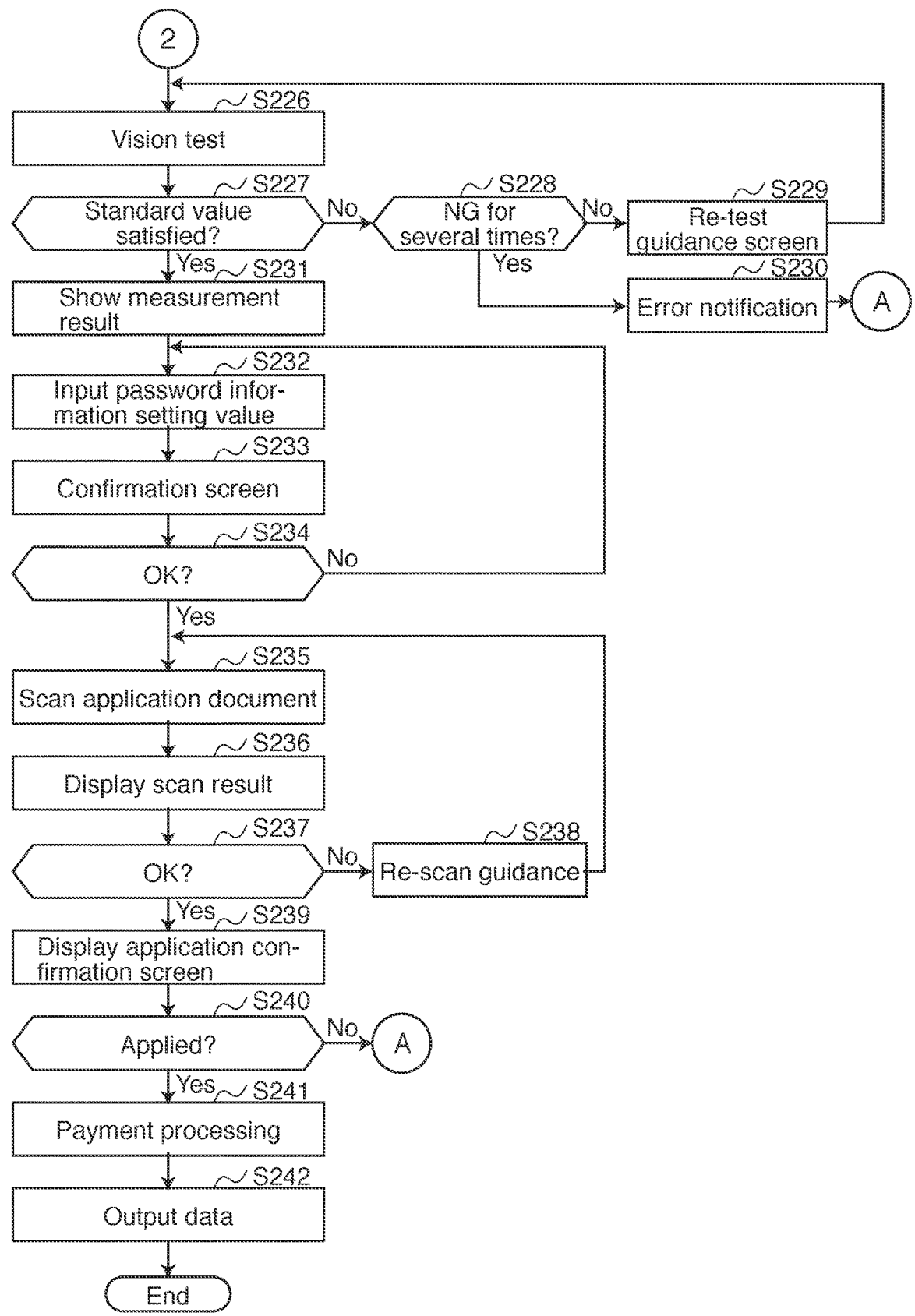
FIG. 25 is a flowchart showing a flow of a process continued from FIG. 18 (the application menu process).
Figure 26:
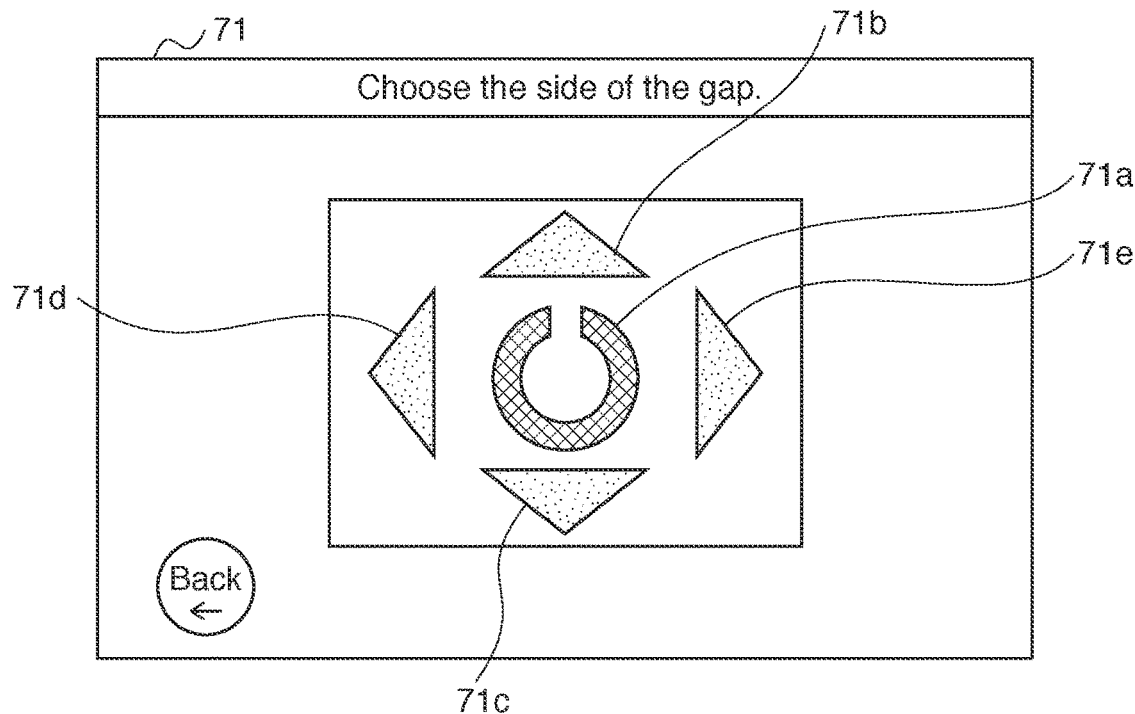
FIG. 26 (a) is a view showing an example of a vision test screen 71.
Figure 26:
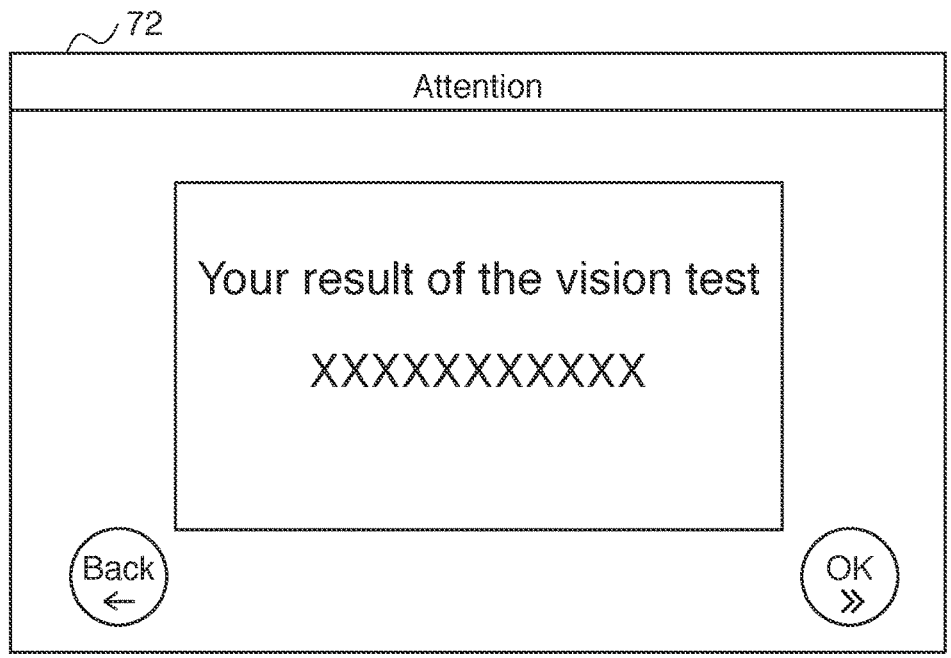

FIG. 25 is a flowchart showing a flow of a process continued from FIG. 18. The control unit 101 executes a vision test process (the step S226). In the step S226, the control unit 101 displays on the operation panel 21 a vision test screen 71 as shown in FIG. 26 (a). On the vision test screen 71, an indicator 71a for a vision test, such as a Landolt C, and operation buttons, such as an upward button 71b, a downward button 71c, a left button 71d, and a right button 71e, are shown to accept response operations from the applicant. For example, in the case of FIG. 26 (a), there is a gap at the top of the Landolt C, so it is correct if the applicant operates the upward button 71b. If a correct response at a predetermined standard value or above can be obtained (a step S227: YES), the control unit 101 displays a test result screen 72 as shown in FIG. 26 (b) (a step S231), and stores the test result in the RAM 105 or in a predetermined folder in the storage unit 106. If the correct response at the predetermined standard value or above cannot be obtained (the step S227: NO), for the first test (a step S228: NO), an instruction for a re-test is shown on the screen (a step S229) and then the re-test is carried out (a step S226). If test results of the predetermined standard value or above cannot be obtained after repeating the test for several times (the step S228: YES), an error is notified (a step S230) and the process returns to the application contents selection screen 51 (the step S201 in FIG. 6).

Figure 27:
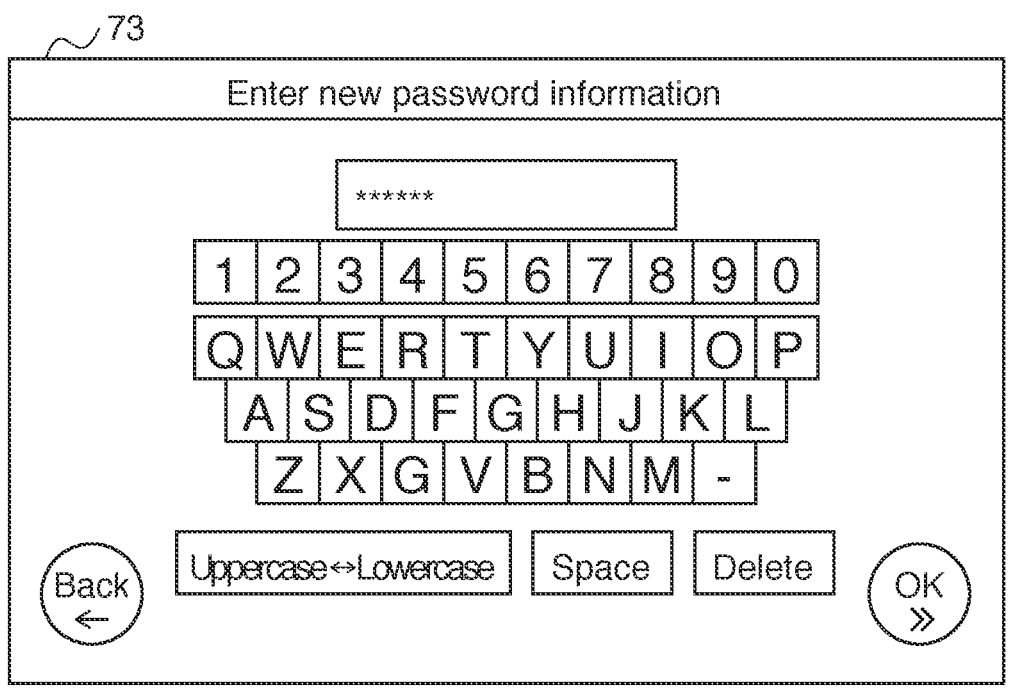
FIG. 27 is a view showing an example of a password information setting screen 73.

If the vision test confirms that the person's eyesight is at the predetermined standard value or above (the step S227: YES), the control unit 101 then accepts an entry of a password information setting value (a step S232). The value to be entered here is a value for the password information (e.g., a PIN) for the ID card to be applied. The control unit 101 displays a password information setting screen 73 as shown in FIG. 27 on the operation panel 21. When the applicant enters a value (the password information) on the password information setting screen 73, the control unit 101 displays a confirmation screen for the entered contents (a step S233). If a response of a confirmation "OK" is obtained (a step S234: YES), the control unit 101 stores the entered value in a predetermined folder in the storage unit 106 or into the RAM 105 and precedes the process to a step S235. If the response of the confirmation "OK" is not obtained on the confirmation screen in the step S233 (the step S234: NO), the control unit 101 returns the process to the step S232 and accept a re-entry of the password information.

Figure 28:
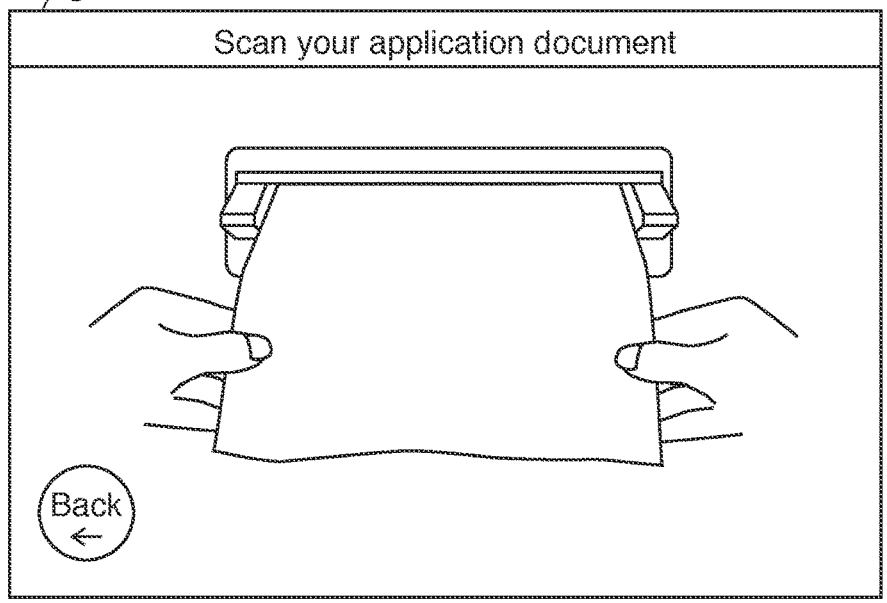
FIG. 28 (a) is a view showing an example of a reading instruction screen 74 for scanning an application document.

When the password information is entered, the control unit 101 next accepts scanning of an application document (the step S235). In the step S235, the control unit 101 shows a reading instruction screen 74 as shown in FIG. 28 (a). The reading instruction screen 74 displays an instruction message, such as "Scan your application document", with illustration of a position of a document insertion slot of the document scanner 34. When a document is set into the document scanner 34, the control unit 101 starts a reading operation by the document scanner 34. When the reading of the document is completed, the control unit 101 displays a checking screen 75 as shown in FIG. 28 (b), showing a result of the scan (a step S236). The checking screen 75 shows the content 75a that has been read by the document scanner 34, with an "OK" button 75b and a "Back" button 75c. If the "OK" button 75b is operated by the applicant (a step S237: YES), the control unit 101 stores the read content as document data into the RAM 105 or a predetermined folder in the storage unit 106, and proceeds to a process in a step S239. If the "Back" button 75c is operated (the step S237: NO), the control unit 101 provides an instruction for rescan by screen display or sound output (a step S238), returns the process to the step S235, and rescans the document.

Figure 29:
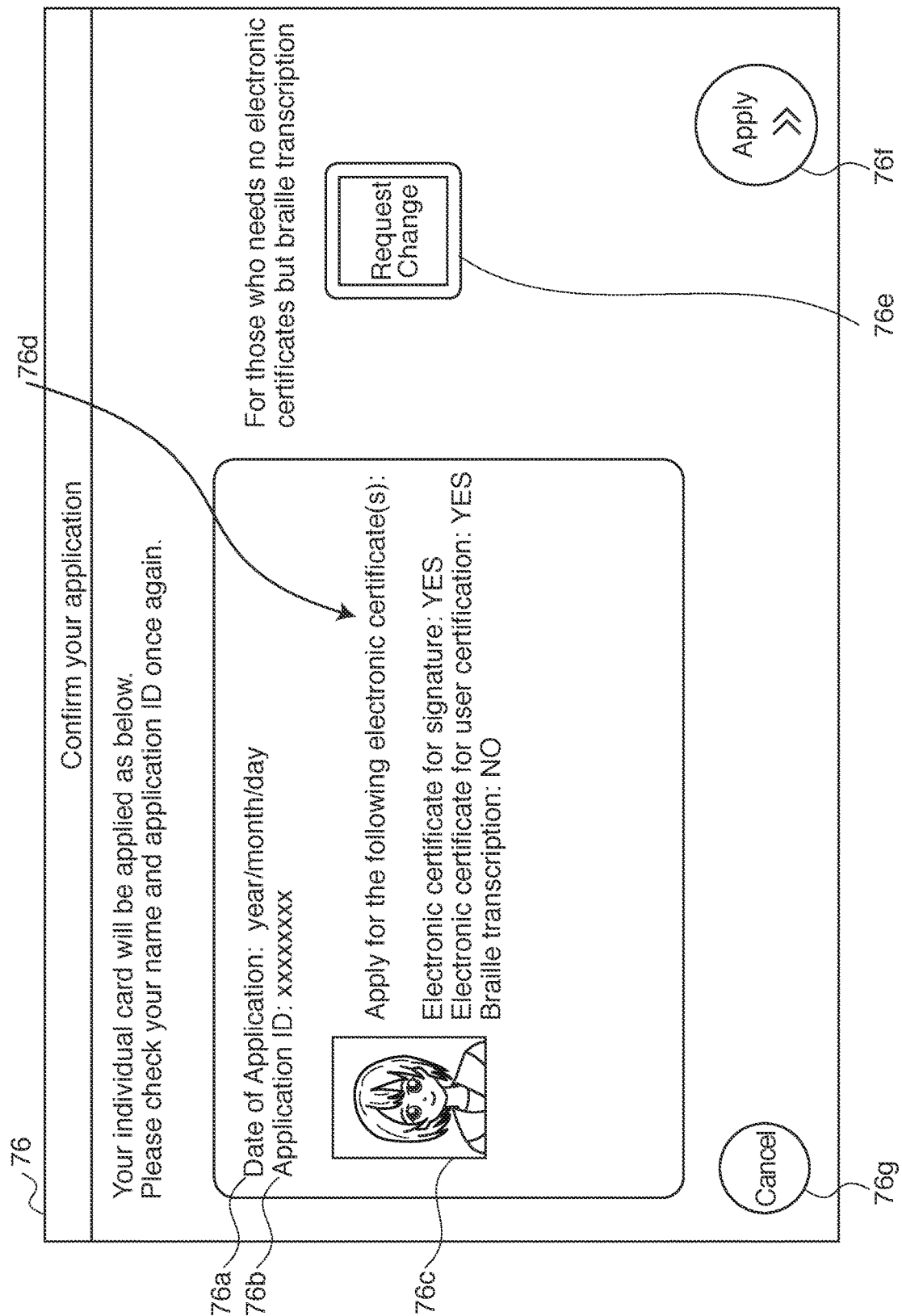
FIG. 29 is a view showing an example of an application confirmation screen 76.

When scanning of the application document is completed, the control unit 101 next displays an application confirmation screen 76 on the operation panel 21 (a step S239). An example shown in FIG. 29 is the application confirmation screen 76 for an individual number card. The application confirmation screen 76 shows a date of application 76a, an application ID 76b, an application image 76c, a request button 76d for an electronic certification or a braille transcription, a change button 76e for the electronic certification or the braille transcription, an application button 76f, a cancel button 76g, and the like.

The control unit 101 issues the date of application 76a and the application ID 76b. The application image 76c is the application image photographed and created in the above-mentioned processes in the step S216. The request button 76d for the electronic certification or the braille transcription is in the information contained in the registered information that the applicant has registered in advance in the server 5 or in the scanned document data. If the change button 76e is operated, the screen transitions to a setting screen for the electronic certification or the braille transcription to accept the change of the request.

When the applicant confirms the application content on the application confirmation screen 76 and operates the application button 76f (a step S240: YES), the process proceeds to a payment process in a step S241. If the cancel button 76g is operated (the step S240: NO), the process returns to the application contents selection screen 51 (the step S201).

In the payment process in the step S241, the control unit 101 calculates the charge and accepts deposition of money into the coin mechanism 22. The control unit 101 also calculates the change and discharges the change from the coin mechanism 22. In a case of an IC card payment by such as an IC card for transportation or a smartphone payment, the control unit 101 cooperates with a payment server for execution of the payment of the charge (the step S241).

Figure 30:
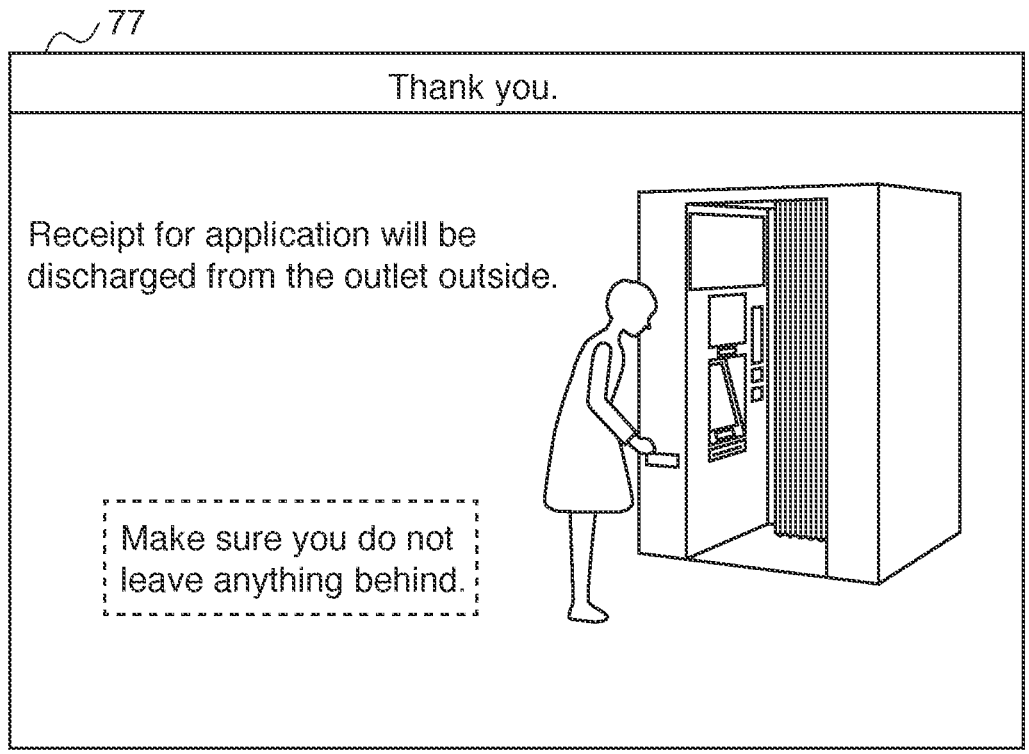
FIG. 30 is a view showing an example of a termination screen 77.

When the payment process is completed, the control unit 101 links the information required for the application with the application ID 76b and the unique ID linked to the authentication code to create data and output the data to the server 5 (a step S242). The information required for the application is set in advance according to the application content, and, for example, for a driver's license application, the required information includes, in addition to the application image, attached information such as the vision test result, the password information set value, and the scanned document data. Also, the identity verification information acquired in the steps S202 to S204 (the information read from the ID card), the authenticity determination result of the ID card, and the like are output to the server 5 as the attached information together with the information required for the application. After that, the control unit 101 displays a termination screen 77 as shown in FIG. 30 and terminates the application menu process.

The contents of the application menu process are not limited to the above and can be appropriately changed according to the application contents. For example, while the application for driver's license includes the vision test and the password information setting, the vision test is not required for the application for the individual number card. Also, in the passport application, the vision test and the password information setting are unnecessary, and the items for determination in the image determination process are to be set so that the image suits the passport photograph. Also, an electronic signature screen may be displayed to accept an entry of an electric signature, and the entered electronic signature may be sent to the server with the application image, the information required for the application, and the like. Also, the photographing device 1 may be provided with an alcohol detector fort detecting alcohol concentration contained in the applicant's breath, and a result of the detection may be sent to the server with the application image, the information required for the application, and the like. Also, the photographing device 1 may be provided with a biometric authentication apparatus that reads biological information of the applicant and executes an authentication process based on the read biological information, and a result of the biometric authentication may be sent to the server with the application image, the information required for the application, and the like. The biometric authentication apparatus may be, for example, a finger-print authentication apparatus that reads the applicant's finger-print information and executes the authentication process based on the read finger-print information, a vein authentication apparatus that reads the applicant's vein information and executes the authentication process based on the read vein information, an iris authentication apparatus that reads the applicant's iris information and executes the authentication process based on the read iris information, or the like.

As described above, the photographing device 1 according the present invention reads the information on the applicant's ID card by using the reading device 31, the camera 23, the IC card reader, or the like. Also, the camera 23 captures the application image that is to be used in the application procedure. The control unit 101 of the photographing device 1 compares the captured application image with the portrait image contained in the ID card information read by the reading device 31 or the camera 23 and determines whether the person is the same or not (the same-person determination process B). Also, the control unit 101 executes the authenticity determination of the ID card (the authenticity determination process). If the same-person determination process determines that the portrait image on the surface of the ID card or contained in the IC chip is the same person as the person photographed in the application image, and the authenticity determination process determines that the ID card is authentic, the application image is output to the predetermined server 5. Thus, strict identity verification is possible and this can prevent illegal acts in electronic applications. In this way, the photographing device 1 can realize electronic applications for administrative procedures and the like. By using the image captured by the photographing device 1 instead of using a home PC or a smartphone, the appropriate application image can be provided.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

DESCRIPTION OF NOTATIONS

1 . . . photographing device
5 . . . server
6 . . . terminal
7 . . . network
10 . . . control device
21 . . . operation panel
22 . . . coin mechanism
23 . . . camera
24 . . . lighting unit
25 . . . printer
26 . . . print outlet
27 . . . sound output unit
28 . . . curtain
29 . . . subject sensor
31 . . . reading device
32 . . . surface image scanner
33 . . . IC chip reader
34 . . . document scanner
35 . . . code reader
51 . . . application contents selection screen
52 . . . code reader instruction screen
53 . . . code input screen
54 . . . code confirmation screen
55 . . . ID card insertion instruction screen
56 . . . password information input screen
57 . . . error notification screen
58 . . . action instruction screen
61 . . . application image photographing screen
62, 63 . . . operation screen
71 . . . vision test screen
72 . . . test result screen
73 . . . password information setting screen
74 . . . reading instruction screen
75 . . . checking screen for read document data
76 . . . application confirmation screen
77 . . . termination screen
101 . . . control unit
401 . . . identity verification unit
402 . . . authenticity determination unit
403 . . . action instruction unit
404 . . . biometric determination unit (living-body determination unit)
405 . . . application image capture unit
406 . . . object detection unit
407 . . . same-person determination unit A 408 . . . same-person determination unit B
409 . . . image determination unit
411 . . . vision test unit
412 . . . encryption information configuration value input unit (password information input unit)
413 . . . document scan unit
414 . . . payment process unit
415 . . . data output unit

What is claimed is:

1. A photographing device having a camera that captures an image of an applicant as a person to be photographed, the photographing device comprising:
reading means configured to read information of an identity verification medium of the applicant;
application image capture means configured to capture an application image by using the camera, the application image being a photograph that is to be used for an application procedure;
same-person determination means configured to compare an image of a person contained in the information read by the reading means with the application image and to determine whether the person is the same or not;
authenticity determination means configured to determine authenticity of the identity verification medium based on the information read by the reading means; and
output means configured to output the application image to a predetermined server if it is determined by the same-person determination means that the person is the same and it is determined by the authenticity determination means that the identity verification medium is authentic, wherein:
the reading means includes a scanner or a camera configured to read surface information of the identity verification medium, and a reader configured to read data recorded in a recording medium in the identity verification medium, and
the authenticity determination means:
(i) determines whether there is inconsistency in contents of the surface information based on the surface information read by the scanner or the camera to obtain a determination result,
(ii) compares first information acquired from the surface information with first data read by the reader from a memory region that is not protected by password information in the recording medium to obtain a first comparison result, and
(iii) compares second information acquired from the surface information with second data read by the reader from a memory region that is protected by password information in the recording medium to obtain a second comparison result, and
determines that the identity verification medium is authentic when all of said (i)-(iii) determination, first comparison and second comparison results are affirmative.

2. The photographing device according to claim 1, wherein
the application image capture means is configured to allow wide-angle photography; and
the photographing device further comprises object detection means configured to detect from the captured image a rectangular object covering a face of the person to be photographed.

3. The photographing device according to claim 2, wherein
the object detection means is configured to detect the rectangular object from the wide-angle captured image by detecting at least one of a corner, a frame, and an edge.

4. The photographing device according to claim 1, further comprising:
image determination means configured to determine whether the application image is an appropriate photograph to be used for the application procedure.

5. The photographing device according to claim 1, further comprising:
vision test means configured to display a vision test screen and to carry out a vision test for the applicant.

6. The photographing device according to claim 1, further comprising:
electronic signature means configured to display an electronic signature screen and to accept an input of an electronic signature of the applicant.

7. The photographing device according to claim 1, further comprising:
an alcohol detector that detects alcohol contained in the applicant's breath.

8. The photographing device according to claim 1, further comprising:
a biometric authentication apparatus that reads biological information of the applicant and executes an authentication process based on the read biological information.

9. The photographing device according to claim 1, further comprising:
a document scanner that reads a document that is used for the application procedure, wherein
the output means is configured to output document data read by the document scanner together with the application image to the predetermined server.

10. The photographing device according to claim 1, further comprising:
setting means configured to set password information necessary for the application procedure, wherein
the output means is configured to output the password information set by the setting means together with the application image to the predetermined server.

11. The photographing device according to claim 1, further comprising:
registered-information acquiring means configured to acquire registered information registered by the applicant on the server in advance; and
identity verification means configured to verify identity of the applicant by comparing the registered information acquired by the registered-information acquiring means with the information read by the reading means.

12. A control method of a photographing device having a camera that captures an image of an applicant as a person to be photographed, the method comprising:
a reading step of reading information on identity verification medium of the applicant;
an application image capture step of capturing an application image by using the camera, the application image being a photograph that is to be used for an application procedure;
a first same-person determination step of comparing an image of a person contained in the information read in the reading step with the application image and determining whether the person is the same or not;
an authenticity determination step of determining authenticity of the identity verification medium based on the information read in the reading step; and an output step of outputting the application image to a predetermined server if it is determined in the first same-person determination step that the person is the same and it is determined in the authenticity determination step that the identity verification medium is authentic, wherein:

the reading step includes reading surface information of the identity verification medium by a scanner or a camera, and reading data recorded in a recording medium in the identity verification medium by a reader, and the authenticity determination step includes:
(i) determining whether there is inconsistency in contents of the surface information based on the surface information read by the scanner or the camera to obtain a determination result,
(ii) comparing first information acquired from the surface information with first data read by the reader from a memory region that is not protected by password information in the recording medium to obtain a first comparison result, and
(iii) comparing second information acquired from the surface information with second data read by the reader from a memory region that is protected by password information in the recording medium to obtain a second comparison result, and
determining that the identity verification medium is authentic when all of said (i)-(iii) determination, first comparison and second comparison results are affirmative.

13. The control method of the photographing device according to claim 12, the method further comprising:
a step of accepting an entry of an authentication code and acquiring a unique ID, which is information linked to the authentication code, wherein
the unique ID is linked to the application image and sent to the server in the output step.

14. The control method of the photographing device according to claim 13, wherein
attachment information is further linked to the application image and the unique ID and sent to the server in the output step.

15. The control method of the photographing device according to claim 12, the method further comprising:
a second same-person determination step of comparing a front face image of the applicant that is cutout from a movie captured in a living-body determination process with the application image and determining whether the photographed person is the same person in the movie or not.

16. The control method of the photographing device according to claim 12, wherein
a front face image of the applicant that is cutout from a movie captured in a living-body determination process is further compared with the image of the person contained in the information read in the reading step as well as with the application image so as to determine if the images are of the same person.

17. A non-transitory storage medium that stores a program causing a control device of a photographing device, which has a camera that captures an image of an applicant as a person to be photographed, to function as
reading means configured to read information of an identity verification medium of the applicant;
application image capture means configured to capture an application image by using the camera, the application image being a photograph that is to be used for an application procedure;
same-person determination means configured to compare an image of a person contained in the information read by the reading means with the application image to determine whether the person is the same or not;
authenticity determination means configured to determine authenticity of the identity verification medium based on the information read by the reading means; and
output means configured to output the application image to a predetermined server if it is determined by the same-person determination means that the person is the same and it is determined by the authenticity determination means that the identity verification medium is authentic, wherein:

the reading means includes a scanner or a camera configured to read surface information of the identity verification medium, and a reader configured to read data recorded in a recording medium in the identity verification medium, and the authenticity determination means:
(i) determines whether there is inconsistency in contents of the surface information based on the surface information read by the scanner or the camera to obtain a determination result,
(ii) compares first information acquired from the surface information with first data read by the reader from a memory region that is not protected by password information in the recording medium to obtain a first comparison result, and
iii) compares second information acquired from the surface information with second data read by the reader from a memory region that is protected by password information in the recording medium to obtain a second comparison result, and
determines that the identity verification medium is authentic when all of said (i)-(iii) determination, first comparison and second comparison results results are affirmative.

* * * * *